(12) United States Patent
Hoying et al.

(10) Patent No.: US 10,617,274 B2
(45) Date of Patent: Apr. 14, 2020

(54) CLEANING PAD HAVING CORRELATED CLEANING PERFORMANCE

(71) Applicant: The Procter & Gamble Company, Cincinnati, OH (US)

(72) Inventors: David John Hoying, Cincinnati, OH (US); Fernando Ray Tollens, Cincinnati, OH (US); Larry L. Huston, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 547 days.

(21) Appl. No.: 14/873,437

(22) Filed: Oct. 2, 2015

(65) Prior Publication Data

US 2017/0095134 A1  Apr. 6, 2017

(51) Int. Cl.
*A47L 13/16* (2006.01)
*B32B 5/26* (2006.01)
*B32B 5/02* (2006.01)
*A47L 13/20* (2006.01)

(52) U.S. Cl.
CPC ............ *A47L 13/16* (2013.01); *A47L 13/20* (2013.01); *B32B 5/022* (2013.01); *B32B 5/26* (2013.01); *B32B 2262/02* (2013.01); *B32B 2262/062* (2013.01); *B32B 2307/538* (2013.01); *B32B 2307/726* (2013.01); *B32B 2432/00* (2013.01)

(58) Field of Classification Search
CPC ............ A47L 13/20; A47L 13/16; B32B 5/26
USPC .......................................................... 15/225
See application file for complete search history.

(56) References Cited

U.S. PATENT DOCUMENTS

| | | | | |
|---|---|---|---|---|
| 4,588,400 A | * | 5/1986 | Ring | A61L 15/28 424/447 |
| 4,780,361 A | * | 10/1988 | Schlein | A47L 13/16 442/374 |
| 5,476,456 A | * | 12/1995 | Rankin | A47C 27/005 128/849 |
| 5,607,414 A | * | 3/1997 | Richards | A61F 13/15203 604/358 |

(Continued)

FOREIGN PATENT DOCUMENTS

| WO | WO 00/42961 A2 | 7/2000 |
|---|---|---|
| WO | WO 01/23510 A2 | 4/2001 |

(Continued)

OTHER PUBLICATIONS

U.S. Appl. No. 14/873,409, filed Oct. 2, 2015, Tollens, et al.

(Continued)

*Primary Examiner* — Michael D Jennings
(74) *Attorney, Agent, or Firm* — John T. Dipre

(57) ABSTRACT

A cleaning pad for absorbing liquids from a hard, target surface. The cleaning pad has a hydrophobic floor sheet, and a core joined to the floor sheet. The core has absorbent gelling material therein with a gradient distribution, so that the pad has a particular minimum absorbency as used with water or with common amine oxide cleaning solution. A hydrophilic smoothing strip is joined to the outwardly facing surface of said floor sheet. The cleaning pad provides both good absorbency and a coefficient of friction falling within a specified range judged advantageous for cleaning. The absorbency and coefficient of friction work well with both water and an amine oxide cleaning solution.

1 Claim, 28 Drawing Sheets

(56) References Cited

U.S. PATENT DOCUMENTS

| | | | |
|---|---|---|---|
| 5,810,796 A * | 9/1998 | Kimura | A61F 13/15203 604/365 |
| 5,960,508 A * | 10/1999 | Holt | A47L 13/16 15/209.1 |
| 6,003,191 A | 12/1999 | Sherry et al. | |
| 6,048,123 A | 4/2000 | Holt et al. | |
| 6,101,661 A * | 8/2000 | Policicchio | A47L 13/16 15/228 |
| 6,245,413 B1 | 6/2001 | Kenmochi et al. | |
| 6,601,261 B1 | 8/2003 | Holt et al. | |
| 6,681,434 B2 | 1/2004 | Smith | |
| 6,701,567 B2 | 3/2004 | Smith | |
| 6,842,936 B2 | 1/2005 | Policicchio et al. | |
| 6,993,805 B2 * | 2/2006 | Prodoehl | A47L 17/08 15/118 |
| 6,996,871 B1 | 2/2006 | Policicchio | |
| 7,037,569 B2 | 5/2006 | Curro et al. | |
| 7,096,531 B2 | 8/2006 | Policicchio | |
| 7,458,128 B2 | 12/2008 | Smith et al. | |
| 7,480,956 B2 | 1/2009 | Policicchio et al. | |
| 7,624,468 B2 | 12/2009 | Reddy et al. | |
| 8,341,797 B2 | 1/2013 | Young | |
| 8,707,505 B2 | 4/2014 | Maranghi et al. | |
| 9,027,195 B1 * | 5/2015 | Rhee | A47L 13/46 15/104.94 |
| 9,833,118 B2 * | 12/2017 | Policicchio | A47L 13/16 |
| 2003/0049480 A1 * | 3/2003 | Gagliardini | A61L 15/28 428/532 |
| 2003/0200991 A1 | 10/2003 | Keck et al. | |
| 2004/0074520 A1 | 4/2004 | Truong et al. | |
| 2005/0076936 A1 | 4/2005 | Pung et al. | |
| 2010/0031463 A1 * | 2/2010 | Adams | A47L 13/20 15/231 |
| 2011/0041274 A1 | 2/2011 | Ogale | |
| 2012/0308780 A1 | 12/2012 | Roettger et al. | |
| 2015/0128364 A1 | 5/2015 | Dooley et al. | |
| 2017/0095132 A1 * | 4/2017 | Tollens | A47L 13/16 |
| 2017/0095133 A1 * | 4/2017 | Hoying | A47L 13/16 |

FOREIGN PATENT DOCUMENTS

| | | |
|---|---|---|
| WO | WO2002/41746 A2 | 5/2002 |
| WO | WO 2006/044965 A2 | 4/2006 |

OTHER PUBLICATIONS

U.S. Appl. No. 14/873,426, filed Oct. 2, 2015, Hoying, et al.
U.S. Appl. No. 14/873,451, filed Oct. 2, 2015 Hoying, et al.
PCT Search Report; PCT/US2016/054376; 13 pages; dated Dec. 20, 2016.

* cited by examiner

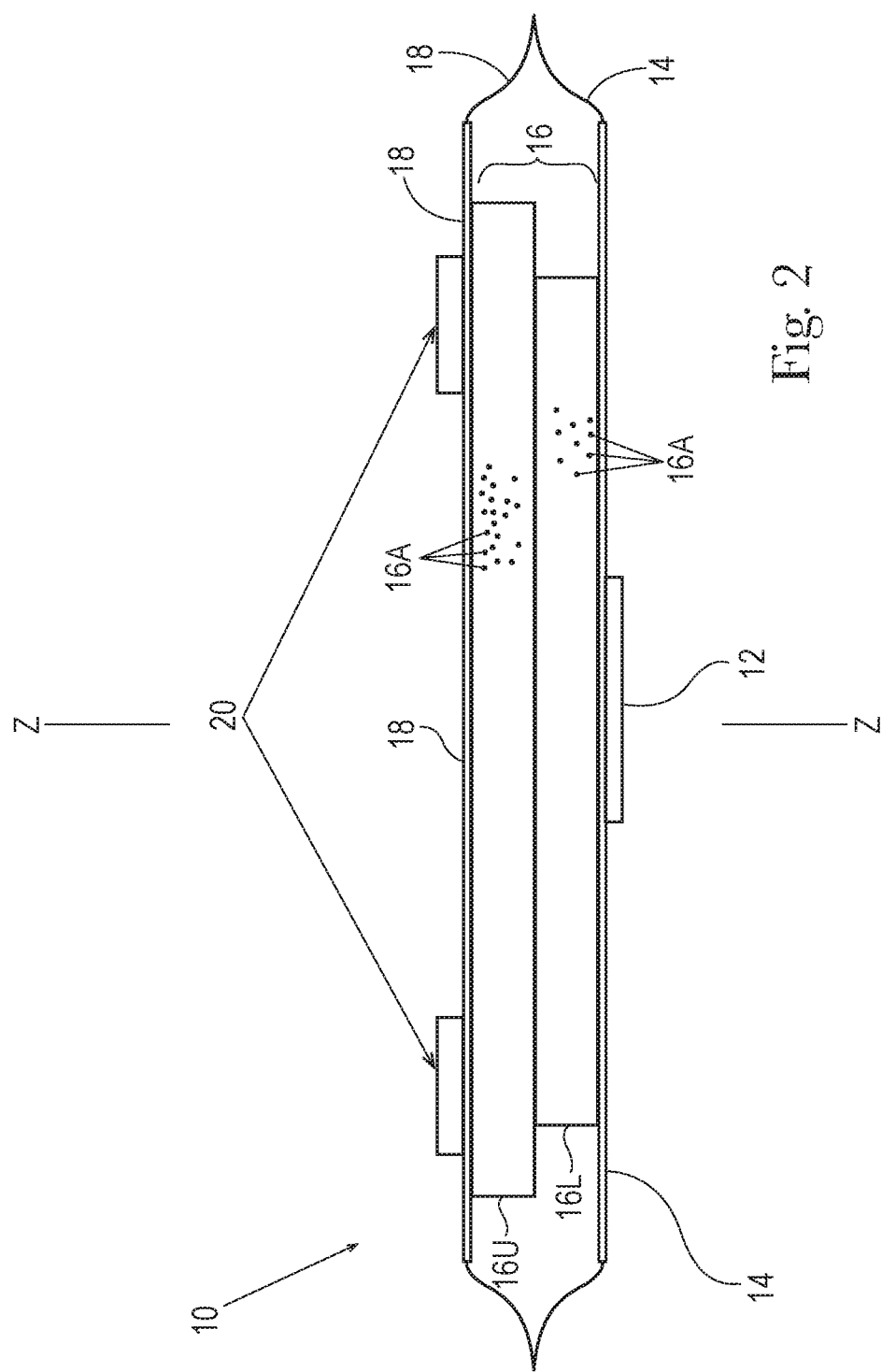

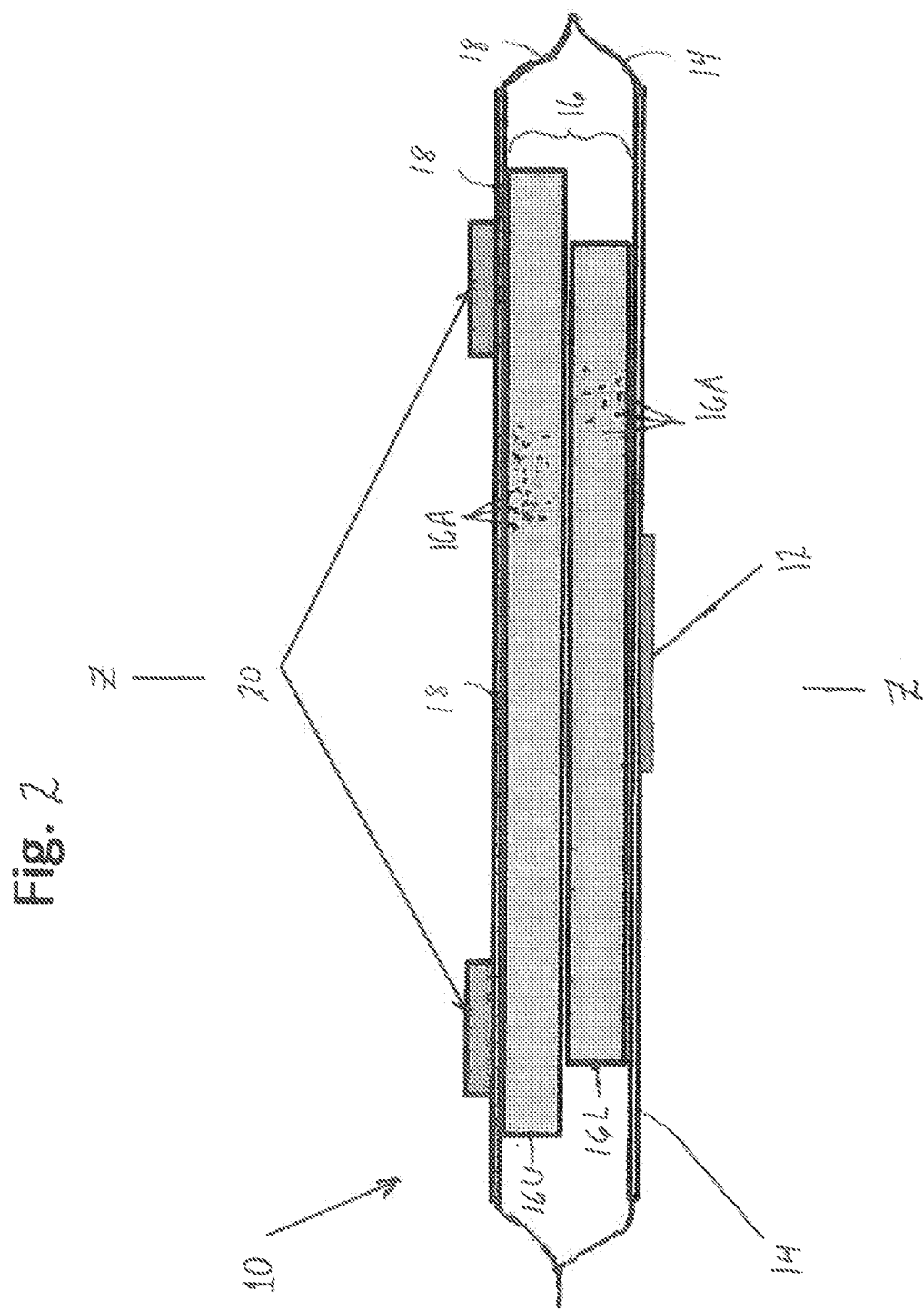

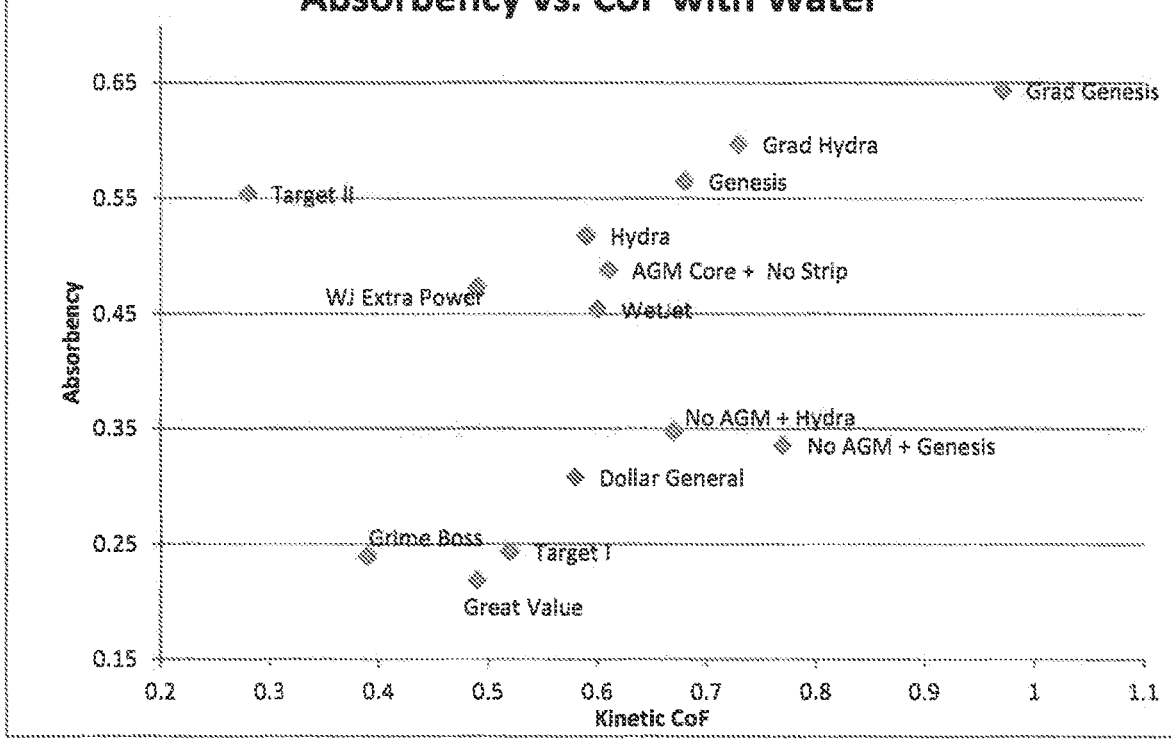

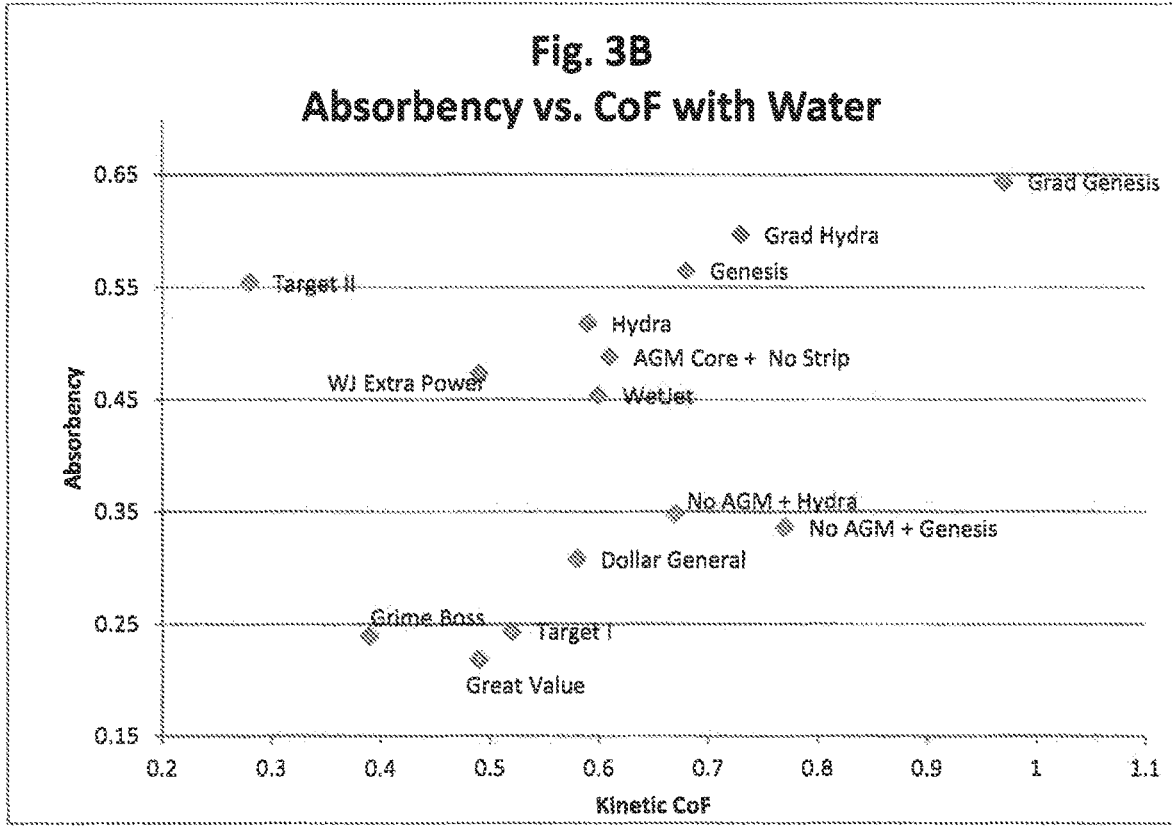

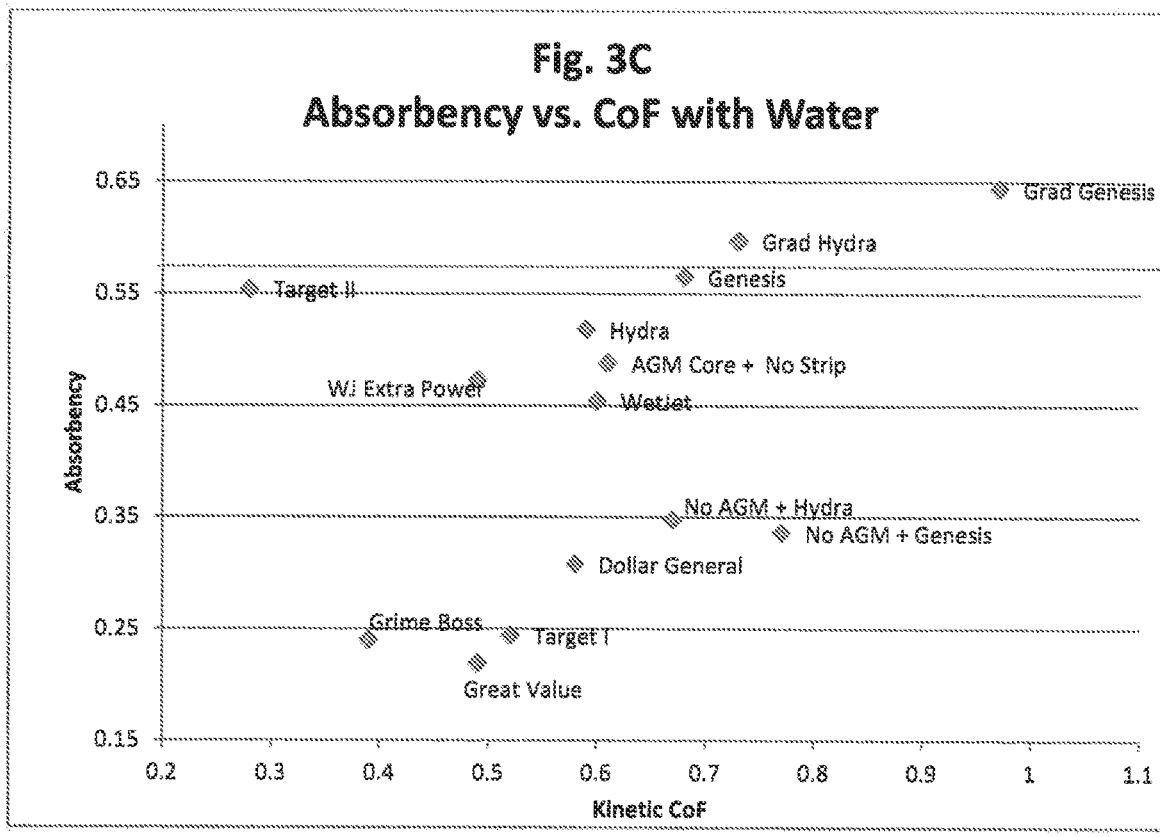

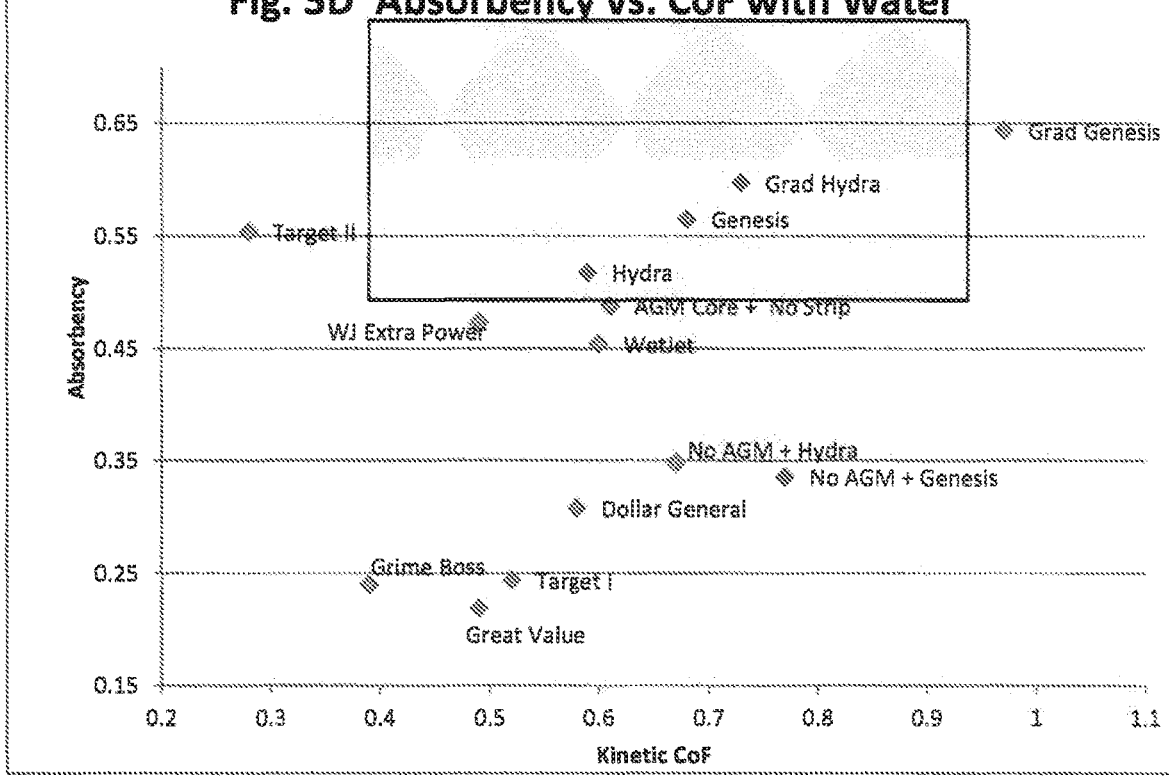

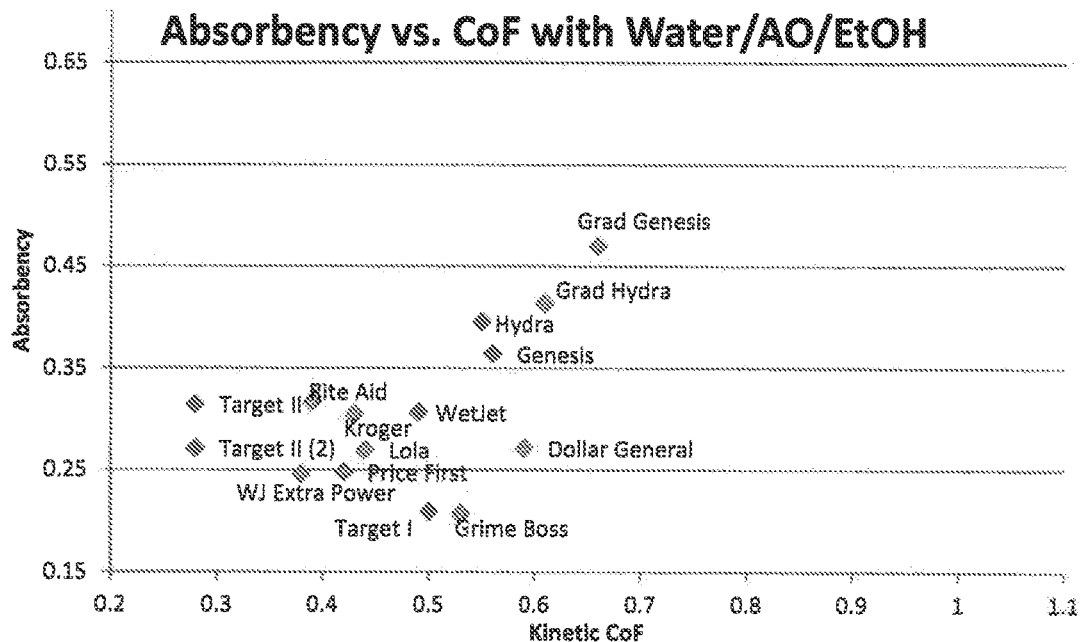

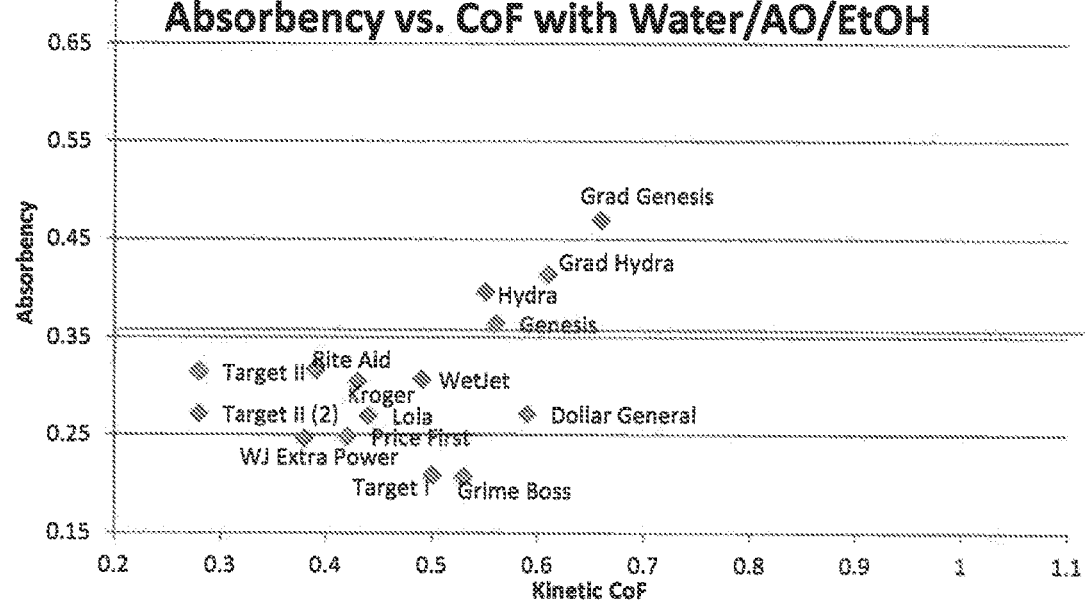

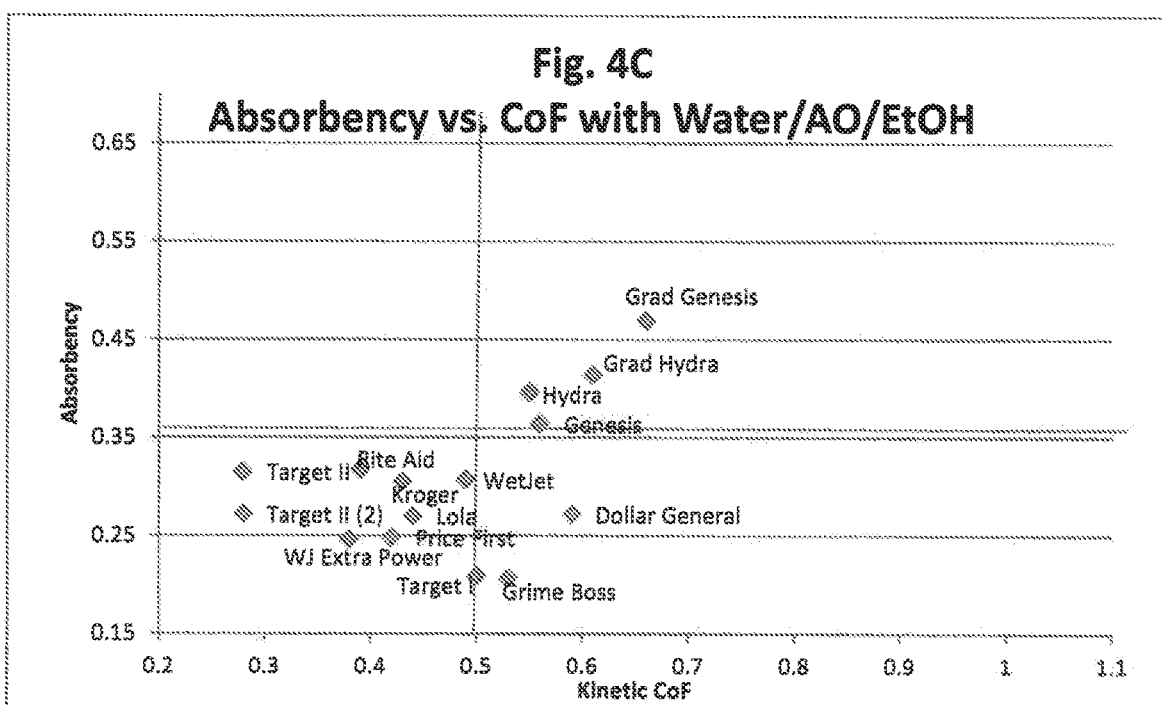

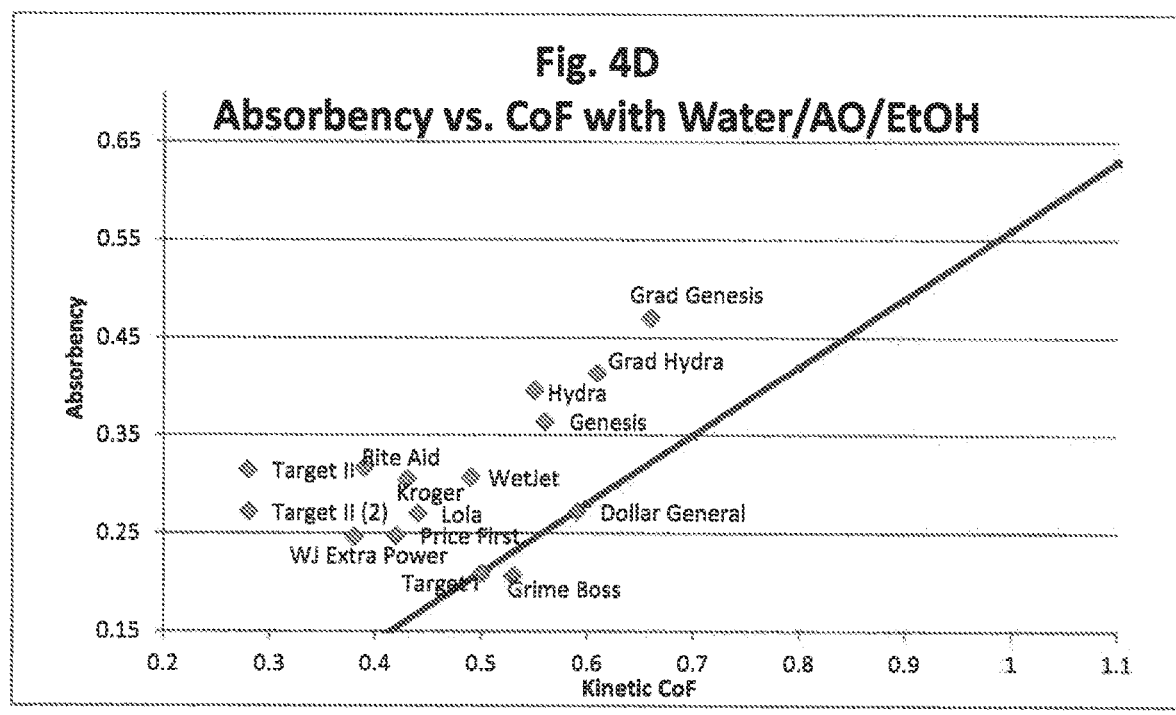

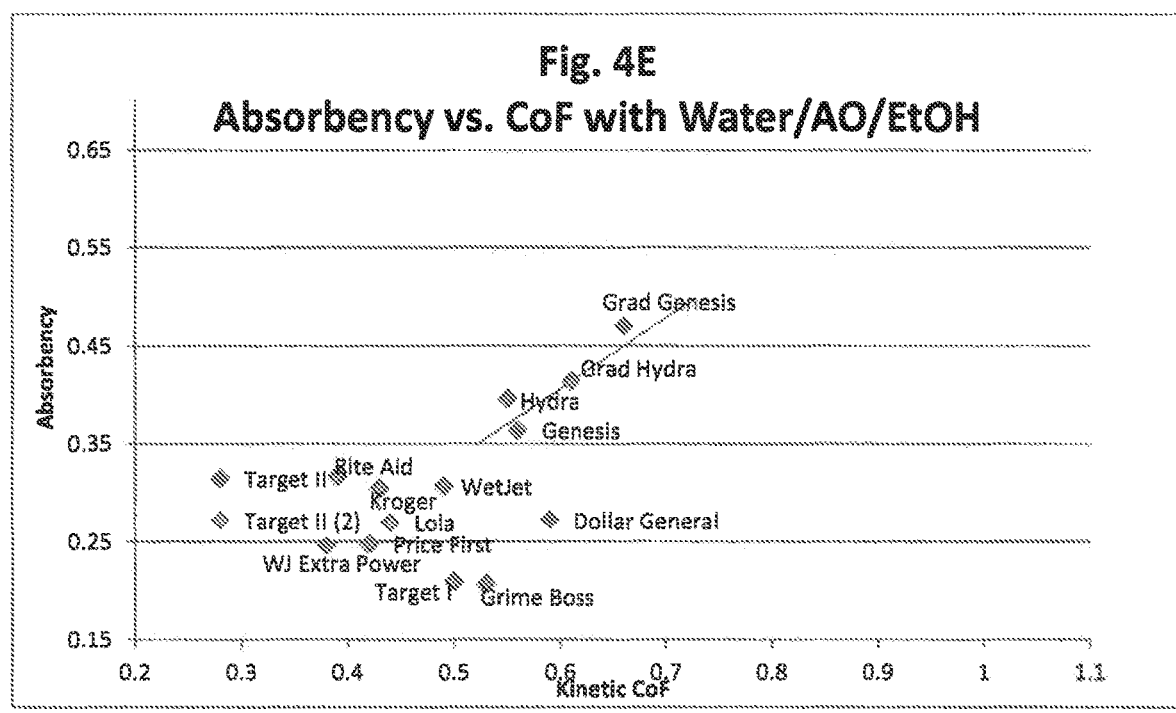

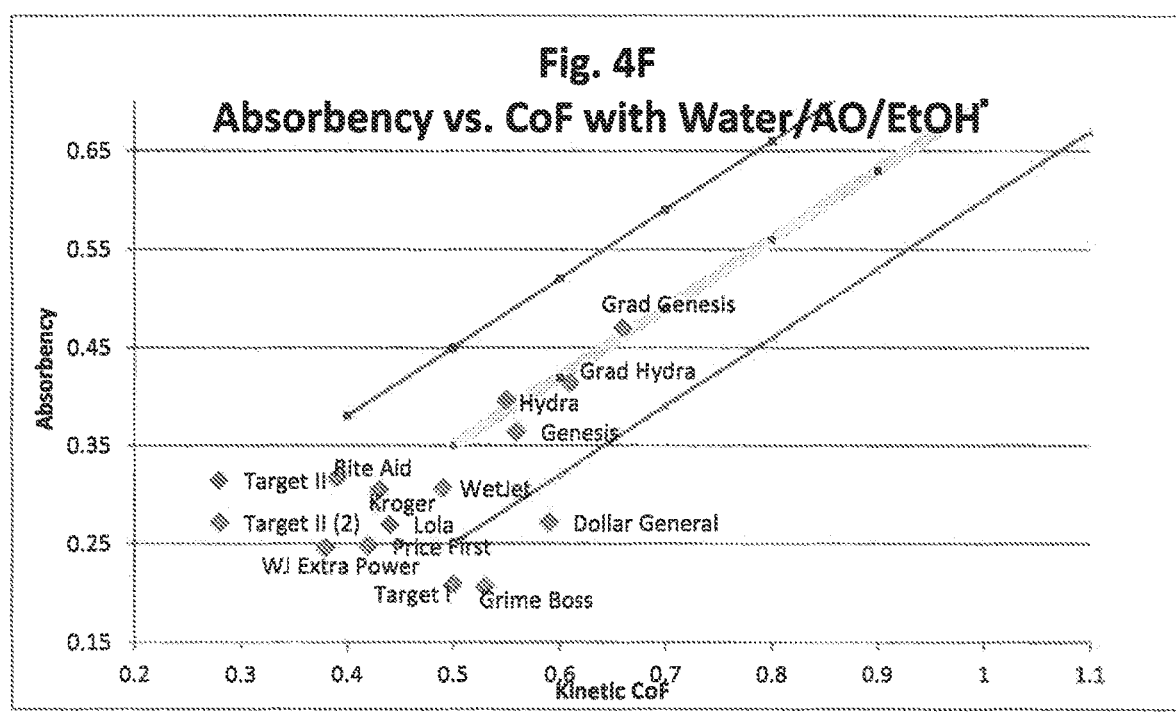

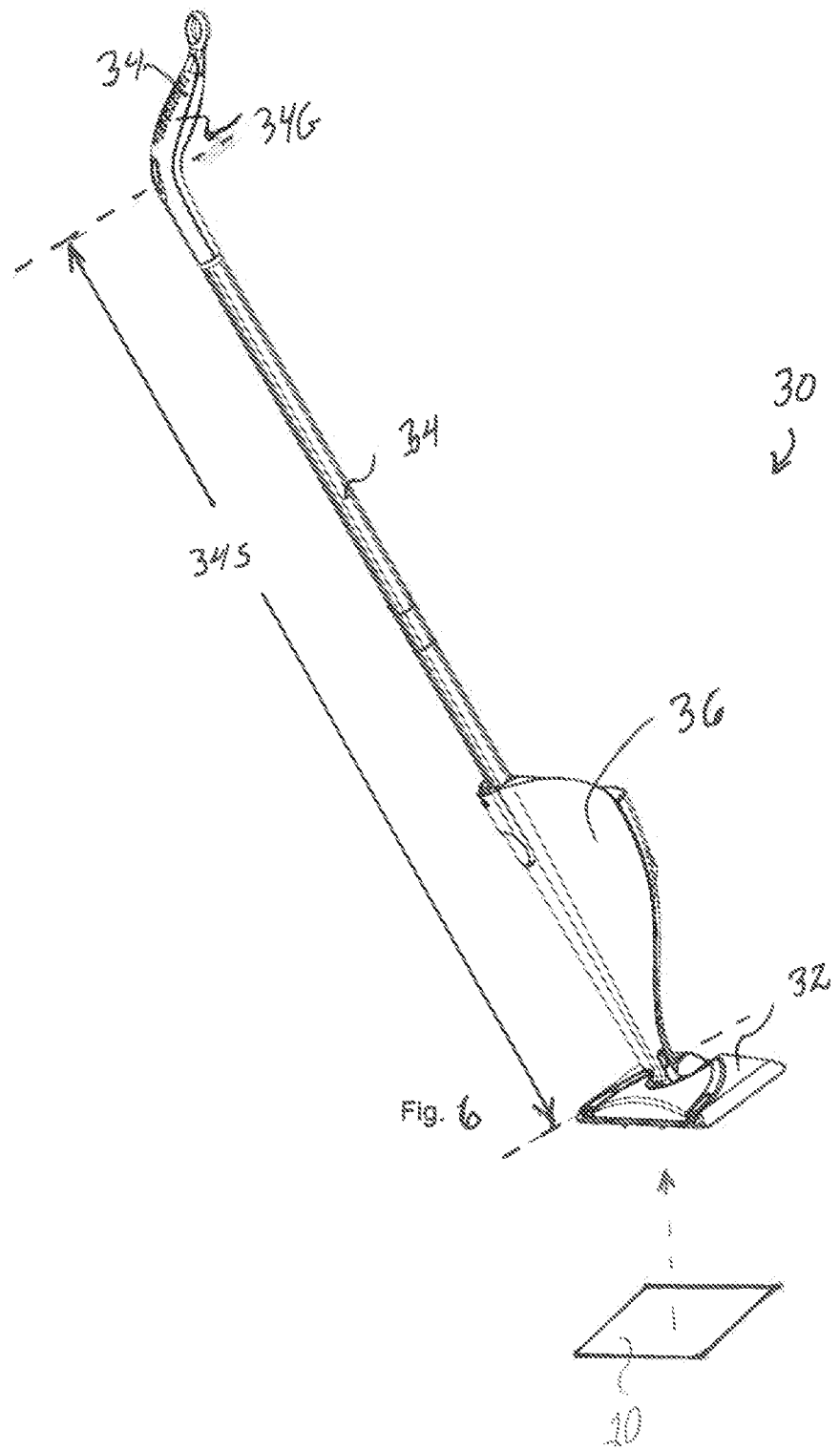

CLEANING PAD HAVING CORRELATED CLEANING PERFORMANCE

FIELD OF THE INVENTION

The present invention relates to a cleaning pad and more particularly to a cleaning pad suitable for absorbing liquid from a hard surface.

BACKGROUND OF THE INVENTION

Attempts have been made in the art to provide cleaning pads which absorb liquids, such as cleaning solutions. The liquids may be absorbed from hard surfaces, such as floors, tables and countertops. Relevant attempts in the art include US 2003/0300991, 2004/0074520, 2011/0041274, U.S. Pat. Nos. 6,003,191, 6,048,123, 6,245,413, 6,601,261, 6,681,434, 6,701,567, 6,996,871, 7,037,569, 7,096,531, 7,163,349, 7,480,956, 7,458,128, 7,624,468, 8,341,797 and 8,707,505, WO200241746.

But hydrophobic floors, such as wood floors having aluminum oxide coatings, are difficult to clean. Dark color floors and shiny floors are hard to clean, particularly if consumers do not use enough cleaning solution. If the consumer uses too much cleaning solution, not all of it may be absorbed and retained by the sheet during cleaning. Improper cleaning may be caused by the coefficient of friction between the cleaning pad and surface being too low, and gliding over debris or being too great, and making cleaning difficult to manually accomplish. Some prior art attempts looked at individual materials and individual components of the cleaning pad, but did not consider how all of these work together to affect cleaning performance. The present invention overcomes these problems.

SUMMARY OF THE INVENTION

In one embodiment the cleaning pad comprises a pad having a floor sheet, and a core joined to the floor sheet. The core has absorbent gelling material (AGM) therein, so that the pad has a particular minimum absorbency as used with water or with common cleaning solutions. In a related embodiment, the cleaning pad may have a coefficient of friction falling within a specified range judged advantageous for cleaning.

In one embodiment the cleaning pad comprises a hydrophobic floor sheet having an inwardly facing surface and an outwardly facing surface opposed thereto. An absorbent core is joined to the inwardly facing surface of the floor sheet. A hydrophilic smoothing strip is joined to the outwardly facing surface of said floor sheet.

DETAILED DESCRIPTION OF THE INVENTION

Figure 1A:
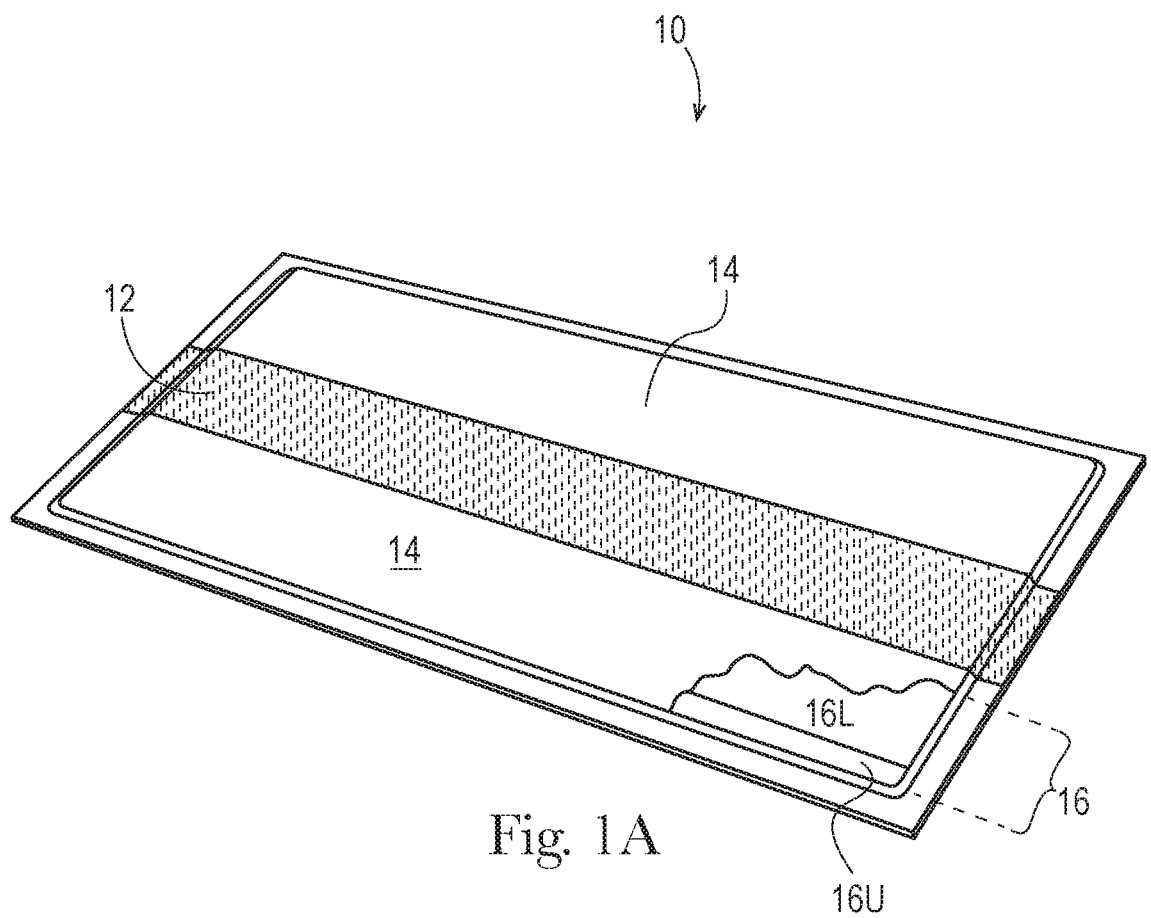
FIG. 1A to a top perspective view an exemplary cleaning pad according to the present invention shown partially in cutaway.
Figure 1B:
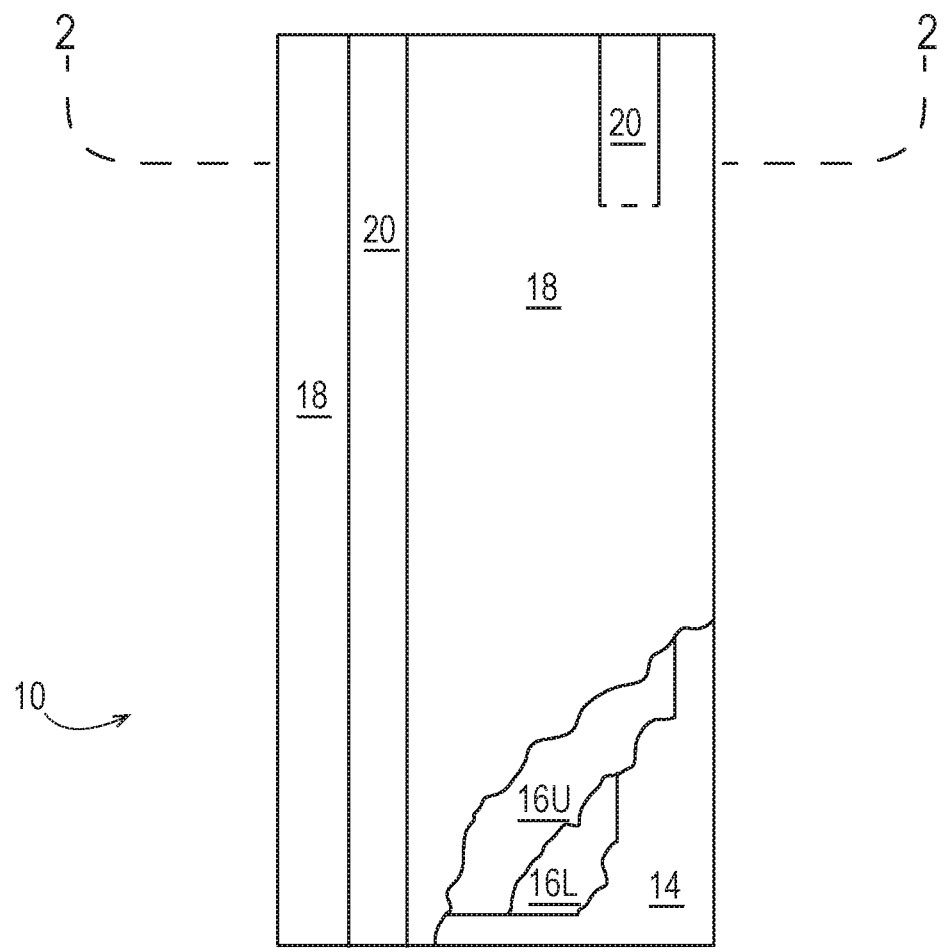
FIG. 1B is a bottom plan view of the cleaning pad of FIG. 1A, shown partially in cutaway and having one attachment strip truncated for clarity.
Figure 2B:
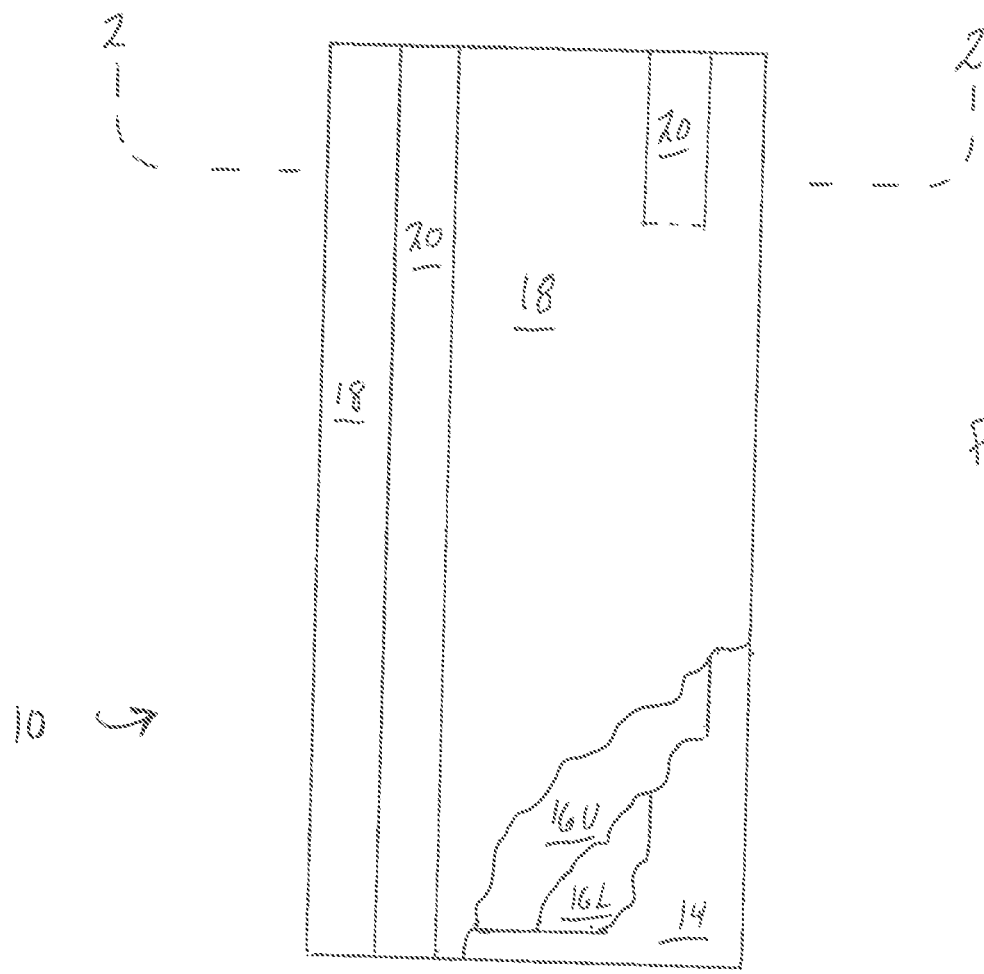
FIG. 2 is a schematic, vertical sectional view taken along lines 2-2 of FIG. 1B.
Figure 5:
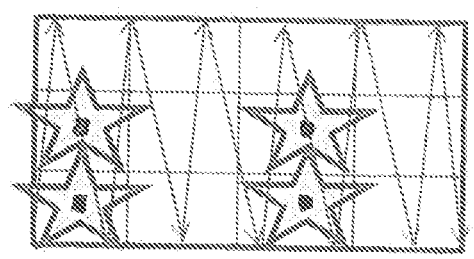

Referring to FIGS. 1A, 1B and 2, the cleaning pad (10) of the present invention may comprise plural layers, to provide for absorption and storage of cleaning fluid and other liquids deposited on the target surface. The target surface will be described herein as a floor, although one of skill will recognize the invention is not so limited. The target surface can be any hard surface, such as a table or countertop, from which it is desired to absorb and retain liquids such as spill, cleaning solutions, etc.

The cleaning pad (10) may comprise a liquid pervious floor sheet (14) which contacts the floor during cleaning and preferably provides a desired coefficient of friction during cleaning. An absorbent core (16), preferably comprising AGM (16A) is disposed on, and optionally joined to an inwardly facing surface of the floor sheet (14). A smoothing strip (12) may be disposed on the outwardly facing surface of the floor sheet (14). Optionally, a back sheet (18) may be joined to the core (16) opposite the floor sheet (14), to provide for attachment of the cleaning pad (10) to an implement (30). The back sheet (18) may have an outwardly facing surface with one or more attachment strips (20) to particularly facilitate attachment to an implement (30). The cleaning pad (10) may be generally planar and define an XY plane and associated X, Y axes. The Z axis is perpendicular thereto and generally vertical when the cleaning pad (10) is in use on a floor.

If desired, the core (16) may comprise AGM (16A) to increase the absorbent capacity of the cleaning pad (10). The AGM (16A) may be in the form of particles may be distributed within the cleaning pad (10) in such a manner to avoid rapid absorbency and absorb fluids slowly, to provide for the most effective use of the cleaning pad (10). The AGM (16A) also entraps dirty liquid absorbed from the floor, preventing redeposition. If desired foam absorbent material or fibrous material may be incorporated into the core (16).

Examining the cleaning pad (10) in more detail, the cleaning pad (10) may comprise plural layers disposed in a laminate. The lowest, or downwardly facing outer layer, may comprise apertures to allow for transmission of liquid therethrough and to promote the scrubbing of the target surface. One, two or more core (16) layers may provide for storage of the liquids, and may comprise the absorbent gelling materials. The cleaning pad (10) may have an absorbent capacity of at least 10, 15, or 20 grams of cleaning solution per gram of dry cleaning pad (10), as set forth in commonly assigned U.S. Pat. Nos. 6,003,191 and 6,601,261.

The optional top, or upwardly facing layer, is a back sheet (18), and may be liquid impervious in order to minimize loss of absorbed fluids and to protect the user's hand if the cleaning pad (10) is used without an implement (30). The top layer may further provide for releasable attachment of the cleaning pad (10) to a cleaning implement (30). The top layer may be made of a polyolefinic film, such as LDPE. A suitable back sheet (18) comprises a PE/PP film having a basis weight of 10 to 30 gsm.

Attached to the back sheet (18) may be one or more optional attachment strips (20). The attachment strips (20) may comprise adhesive, preferably pressure sensitive adhesive, or may loops for removable attachment to complementary hooks on an implement (30). Suitable loop attachment strips (20) may comprise a laminate of PE film and Nylon loops.

The back sheet (18) and floor sheet (14) may be peripherally joined, as is known in the art. This arrangement creates a pocket for securely holding the core (16). The core (16) may be juxtaposed with, and optionally joined to the respective inwardly facing surfaces of the floor sheet (14) and back sheet (18).

The core (16) may comprise a single layer or two or more layers. If plural layers are selected for the core (16), the width of the layers may decrease as the floor sheet (14) is approached, as shown. The core (16) may comprise airlaid cellulose and optionally polymer fiber, as available from Glatfelter of York, Pa. If two airlaid cellulose core (16) layers are selected, each layer of the core (16) may have a basis weight of at least about 75, 100, 125, 150, 175, 200, or 225 gsm and less than about 300 gsm.

Preferably each layer of the core (16) comprises AGM (16A). The AGM (16A) may absorb at least 10, 15 or 20 times its own weight. The AGM (16A) may be blown into the airlaid core (16) layer during manufacture as is known in the art. Suitable AGM (16A) is available as Z3070G from Evonik of Essen, Germany. Arlaid material containing a gradient AGM (16A) distribution is available from Glatfelter of York, Pa.

The gradient distribution AGM (16A) may be achieved by using more than one forming head. For example, an airfelt/AGM (16A) line may have three forming heads. The first head may distribute a relatively large amount of AGM (16A) relative to the cellulose distributed from that head. The second forming head may distribute a less amount of AGM (16A) relative to the cellulose base, with this mixture being laid onto top of the first AGM (16A)/cellulose base. This pattern may be repeated using as many forming heads as desired. If desired the final forming head may distribute pure cellulose and no AGM (16A). Generally the layer from each forming head does not intermix with adjacent layers. Adhesive bonding and/or thermal bonding may hold superposed layers in place and provide structural rigidity.

Suitable core (16) layers and a suitable apparatus and process for making one or more layers of a core (16) having a gradient AGM (16A) distribution are found in U.S. Pat. No. 8,603,622 issued Dec. 10, 2013. The teachings of U.S. Pat. No. 8,603,622 are incorporated herein by reference at column 5, lines 8-14 for the teaching of a suitable core (16) layer and at FIGS. 5-6, with the accompanying discussion at column 16, line 41 to column 17, line 59 for the teaching of production devices suitable to make a core (16) layer for the present invention.

If two airlaid cellulose core (16) layers are selected, the lower core layer (16L), juxtaposed with the floor sheet (14), may comprise about 10 to 20 weight percent AGM (16A), with about 15 percent being found suitable. The upper core layer (16U), juxtaposed with the optional back sheet (18), if any, may comprise about 20 to about 30 weight percent AGM (16A), with about 25 percent being found suitable. The total core (16), with all layers thereof considered, may comprise 5 to 50 w %, or 10 to 45 w % AGM (16A), the amount and gradient distribution of AGM (16A) being found helpful for the present invention. The percentage of AGM (16A), as described and claimed herein refers to the weight percentage of AGM (16A) in that particular core (16) layer (16U or 16L), without regard to the floor sheet (14), back sheet (18), smoothing strip (12) or attachment strips (20).

Each core layer (16L, 16U) and particularly the upper core layer (16U) may be further stratified to provide greater absorbency benefit. The upper core layer (16U) may have three strata, as formed. The strata may comprise 0, 25, and 50 weight percent, monotonically increasing as the back sheet (18), if any, is approached, to provide a gradient distribution.

Generally it is desired that the upper core layer (16U) comprise more AGM (16A), on both an absolute basis and a weight percentage basis than the lower core layer (16L). The arrangement provides the benefit that gel blocking in the lower core layer (16L) does not prevent full absorption of liquid from the target surface and that liquids are transported upwardly and away from the floor sheet (14).

Any arrangement that provides more AGM (16A), preferably on an absolute basis or optionally on a weight percentage basis is suitable. Alternatively, either core (16) layer or a single core (16) layer may have increasing AGM (16A) concentration in the Z direction.

Any such process, as is known in the art, or arrangement, which provides for increasing AGM (16A) in the Z direction as the back sheet (18) is approached is herein considered an AGM (16A) gradient. It is to be recognized that the AGM (16A) gradient may be smooth, comprise one or more stepwise increments or any combination thereof.

The floor sheet (14) may comprise a discrete apertured nonwoven having a basis weight of about 20 to about 80 gsm and particularly about 28 to 60 gsm. The floor sheet (14) may be hydrophobic and made of synthetic fibers. A suitable floor sheet (14) is a 60 gsm PE/PP discrete apertured spunbond nonwoven available as SofSpan from Fitsea of Simpsonville, S.C. The floor sheet (14) may have a contact angle of 101 to 180 degrees with water.

The floor sheet (14) may comprise a smoothing strip (12). The smoothing strip (12) may have a width less than the floor sheet (14) and may comprise at least about 10, 20, 30, 40, 50, 60 or 70% of the floor sheet (14) width. The smoothing strip (12) may have a width of at least 10, 20, 30, 40, 50, 100, 150, 200, 250, mm and less than 70, 80, 100, 200 or 300 mm, with a width of 24 to 44 mm being suitable and a width of 34 mm being preferred.

The smoothing strip (12) may be hydrophilic. As used herein hydrophilic means having a contact angle of 0 to 100 degrees, as measured by the test method set forth herein. The smoothing strip (12) may particularly have a contact angle of 30 to 100 degrees and more particularly 55 to 90 degrees. The smoothing strip (12) may comprise at least 50% cellulosic content to be hydrophilic.

More particularly, a suitable smoothing strip (12) may comprise a laminate of cellulose fibers and synthetic fibers. Such a laminate is believed to be helpful in attaining the performance of the cleaning pads (10) described herein. The cellulose fiber lamina may be outwardly facing, to provide friction and absorbency on the floor. The synthetic fiber layer may be postioned on contacting relationship with the floor sheet (14) to provide integrity during use.

A 23 gsm tissue and 17 gsm polypropylene spunbond hydroentangled, sold as 40 gsm Genesis tissue by Suominen of Helsinki, Finland has been found to be a suitable smoothing strip (12). Another suitable smoothing strip (12) may comprise 28 gsm tissue and 17 gsm polypropylene spunbond hydroentangled, sold as 45 gsm Hydratexture tissue by Suominen.

Cleaning pads (10) made with these smoothing strips (12) are respectively referred to as Genesis and Hydra [for Hydratexture] in all of FIGS. 3 and 4. The smoothing strips (12) were all disposed on the respective floor sheets (14) with the tissue facing outwardly and polypropylene disposed directly on the floor sheet (14).

The smoothing strip (12) may have a surface texture less than 0.5 mm, 0.4 mm or less than 0.3 mm and even be essentially 0 mm. Surface texture is measured as the peak to valley distance, independent of the smoothing strip (12) thickness. A surface texture of less than 0.5 mm is believed to minimize streaking during cleaning, particularly when the floor dries and more particularly when a dark floor dries.

If desired, the smoothing strip (12) may have a color which contrasts with that of the floor sheet (14). This arrangement provides the benefit of a signal to the consumer that the smoothing strip (12) and floor sheet (14) have different functionalities.

Referring to all of FIGS. 3A-4F, inclusive, representative cleaning pads (10) are tested for both absorbency and kinetic coefficient of friction, using the respective test methods described herein. Commercially available cleaning pads (10) include those purchased from or under the names of Dollar General, Grime Boss, Great Value, Kroger, Lola, Price First, Rite Aid, Swiffer and Target, it being understood that commercially available products may change over time.

Four cleaning pads (10) according to the present invention were also tested. Two of these cleaning pads (10) used the aforementioned 34 mm Genesis smoothing strip (12). Two of these cleaning pads (10) used the aforementioned 34 mm Hydra smoothing strip (12). All four of the cleaning pads (10) according to the present invention utilized an absorbent core (16) having two airlaid layers (16U), (16L) of cellulose and AGM (16A), a floor sheet (14) and a back sheet (18). The two cleaning pads (10) labelled 'Grad' used a gradient core (16). The upper core layer (16U) is the core layer disposed closer to and juxtaposed with the back sheet (18). The lower core layer (16L) may be closer to and juxtaposed with the floor sheet (14). One of skill will recognize that juxtaposition includes contacting the adjacent component. Pads made for test purposes and not having AGM (16A) in the absorbent core (16) or a smoothing strip (12) are labelled 'NO AGM' and 'No Strip,' respectively. The specific materials used in the cleaning pads (10) representing the four data points described and claimed herein are set forth in Table 1 below.

The particular core (16) construction provides for a compound gradient distribution of AGM (16A) within the core. The upper core layer (16U) has 35 w % AGM. The lower core layer (16L) has 15 w % AGM. A core (16) having two, or more core layers (16U), (16L) disposed in contacting relationship may have an AGM (16A) gradient distribution which increases, as the floor sheet (14) is approached and decreases, as the back sheet (18) is approached. The AGM (16A) gradient may be monotonic or non-monotonic.

The upper core layer (16U) and/or lower core layer (16L) may have an AGM (16A) gradient distribution therein. Again, it is desired that the AGM (16A) distribution increase/decrease as set forth above within the core layer (16L)(16U).

The upper core layer (16U) of the two cleaning pads (10) according to the present invention and labelled 'Grad' described above has the AGM (16A) distribution set forth in Table 2 below. Particularly the upper core layer (16U) comprises three strata within that particular layer (16U). The strata provide for a gradient AGM (16A) distribution within that layer (16U) and a compound AGM (16A) within the core (16).

TABLE 2

| Strata | w % |
| --- | --- |
| Strata Towards Floor Sheet (14) and Lower Core Layer (16L) | |
| (Latex Glue) | 0.8 |
| (Pulp) | 13.2 |
| (Bico Fiber) | 4.4 |
| Middle Strata | |
| (Pulp) | 20.6 |
| (AGM) | 13.9 |
| Strata Towards Back Sheet (18) | |
| (Pulp) | 20.6 |
| (AGM) | 20.9 |
| (Pulp) | 5.5 |

In contrast, a commercially available Swiffer WetJet cleaning pad has an upper core layer (16U) and lower core layer (16L) with 15 w % and 25 w % AGM, respectively for a total of 20.5 w % AGM in the core (16). This commercially

TABLE 1

| Component | Genesis | Hydra | Grad Genesis | Grad Hydra |
| --- | --- | --- | --- | --- |
| Smoothing Strip (12) | Genesis - 40 gsm Hydroentangled Laminate -- 23 gsm Pulp/ 17 gsm Spunbond | Hydratexture - 45 gsm Hydroentangled Laminate -- 28 gsm Pulp/ 17 gsm Spunbond | Genesis - 40 gsm Hydroentangled Laminate -- 23 gsm Pulp/ 17 gsm Spunbond | Hydratexture - 45 gsm Hydroentangled Laminate -- 28 gsm Pulp/ 17 gsm Spunbond |
| Floor Sheet (14) | 60 gsm Spunbond PP/PE Blend - Apertured | 60 gsm Spunbond PP/PE Blend - Apertured | 60 gsm Spunbond PP/PE Blend - Apertured | 60 gsm Spunbond PP/PE Blend - Apertured |
| Lower Core Layer (16L) | 150 gsm Airlaid - 15% AGM, 29% PE/PET fiber, 56% pulp | 150 gsm Airlaid - 15% AGM, 29% PE/PET fiber, 56% pulp | 150 gsm Airlaid - 15% AGM, 29% PE/PET fiber, 56% pulp | 150 gsm Airlaid - 15% AGM, 29% PE/PET fiber, 56% pulp |
| Upper Core Layer (16U) | 150 gsm Airlaid - 25% AGM, 12% PE/PET fiber, 63% pulp | 150 gsm Airlaid - 25% AGM, 12% PE/PET fiber, 63% pulp | 310 gsm Gradient Airlaid Gradient Core per Table 2 | 310 gsm Gradient Airlaid Gradient Core per Table 2 |
| Back Sheet (18) | 21 gsm PP/PE Film | 21 gsm PP/PE Film | 21 gsm PP/PE Film | 21 gsm PP/PE Film | available cleaning pad has coefficients of friction of 0.6 with water and 0.5 with amine oxide cleaning solution.

If a gradient distribution within a core layer (16L)(16U) occurs, that respective layer is considered as a whole when determining whether the overall core (16) has a gradient AGM (16A) distribution. Thus, the embodiment described and claimed herein has a gradient core (16) due to the AGM (16A) distribution of 15% in the lower core layer (16L) and 35 w % in the upper core layer (16U). An AGM distribution of at least 15 w %, and preferably 20 w %, 25 w %, 30 w % or 40 w % is desired between the lower upper core layer (16U) and lower core layer (16L).

Figure 3A:
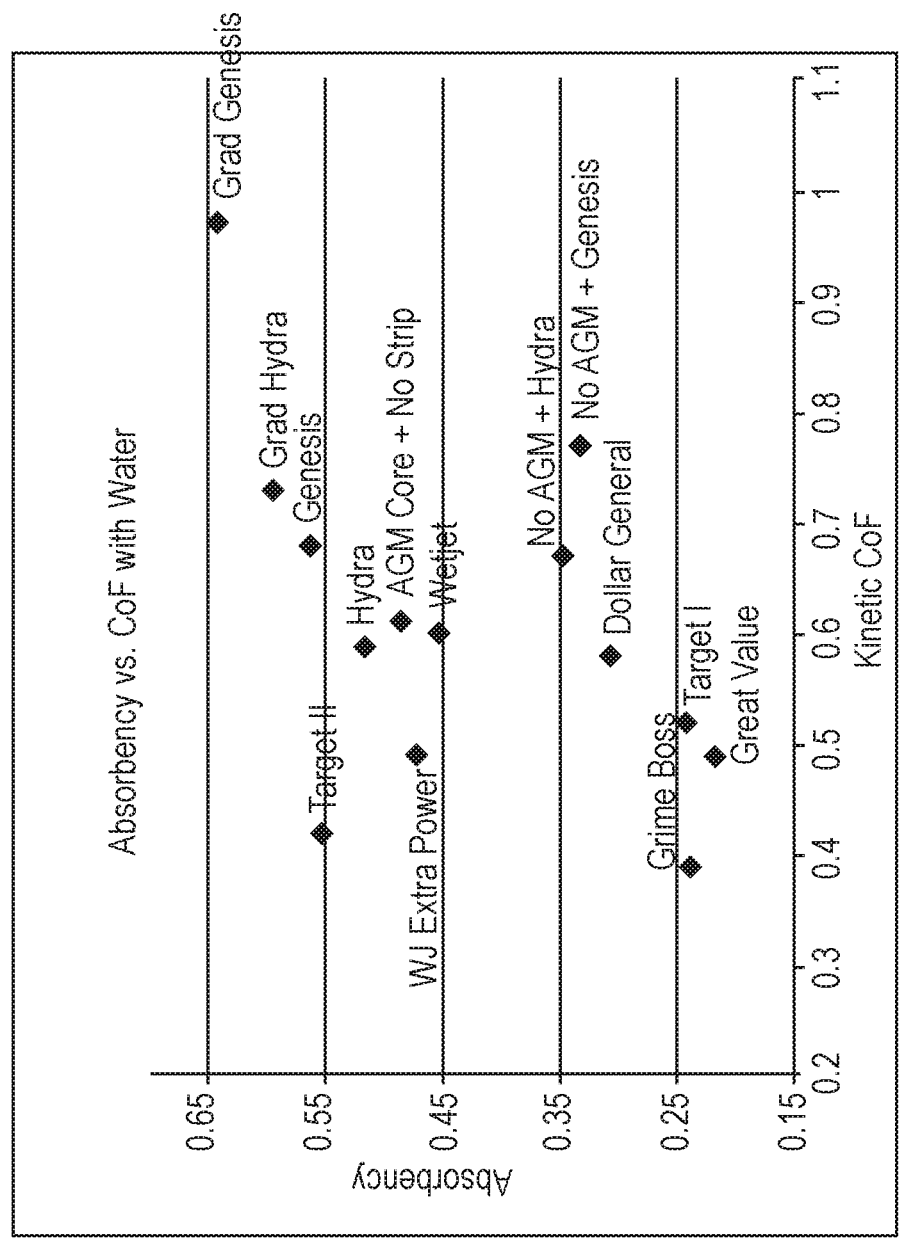
FIGS. 3A-3D are graphical representations of the generally proportionate relationship between coefficient of friction with water and absorbency of water.

Referring to FIG. 3A, the inventors have recognized that, under testing with deionized water, cleaning pads (10) exhibit a generally positive correlation between coefficient of friction and absorbency. Conceptually two relatively straight lines may be drawn, one from WetJet Extra Power to Grad Hydra and one from Great Value to No AGM+ Hydra. Such correlation is unexpected in view of the prior art.

Figure 3B:
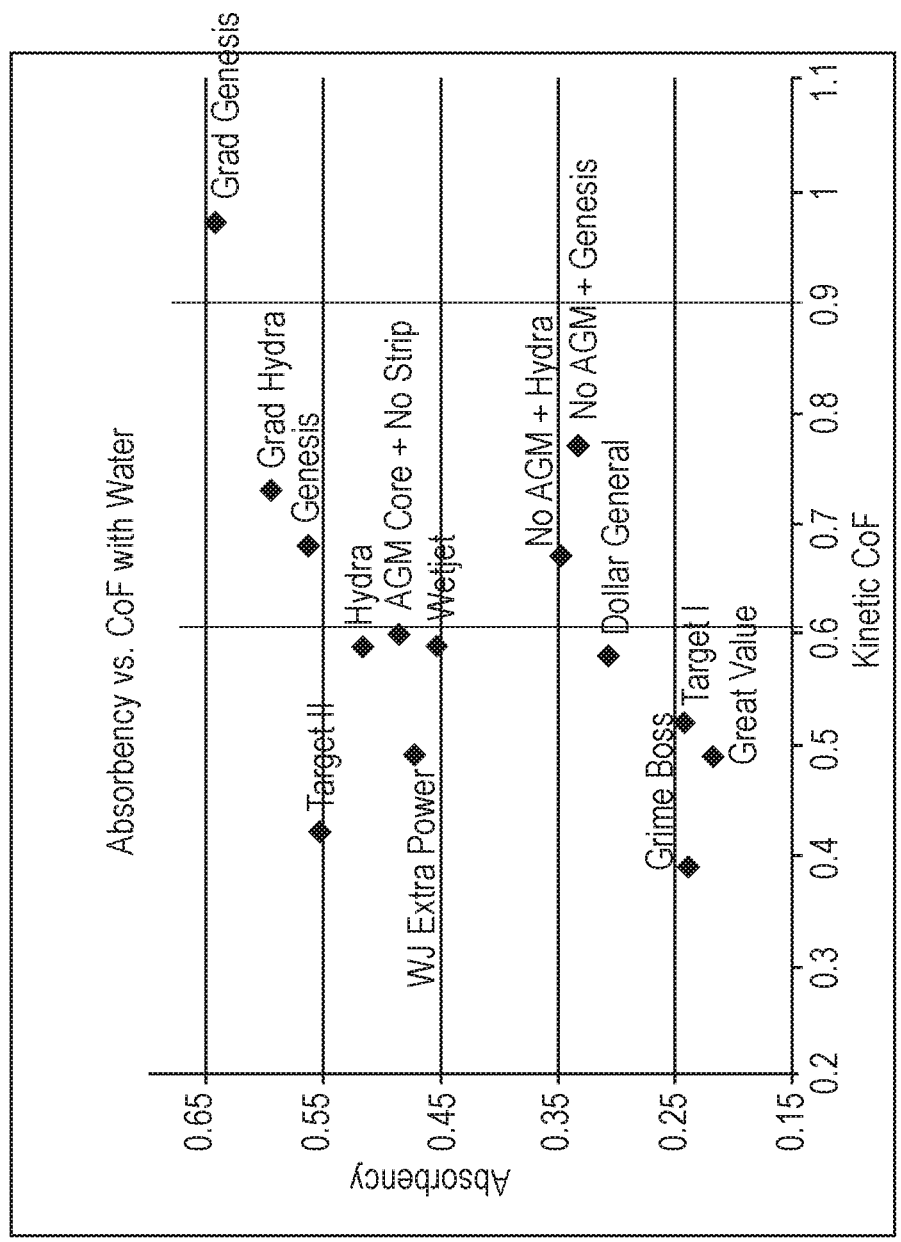

Referring to FIG. 3B, it can be seen that under testing with deionized water, cleaning pads (10) according to the present invention may have an absorbency of at least 0.45, preferably at least 0.48, more preferably at least 0.5, more preferably at least 0.55, more preferably at least 0.6, more preferably at least 0.65, but less than 1.0, 0.9 or 0.8. An absorbency with water in this range is judged advantageous for cleaning purposes, without requiring undue AGM (16A) levels and the associated costs and material handling challenges.

Figure 3C:
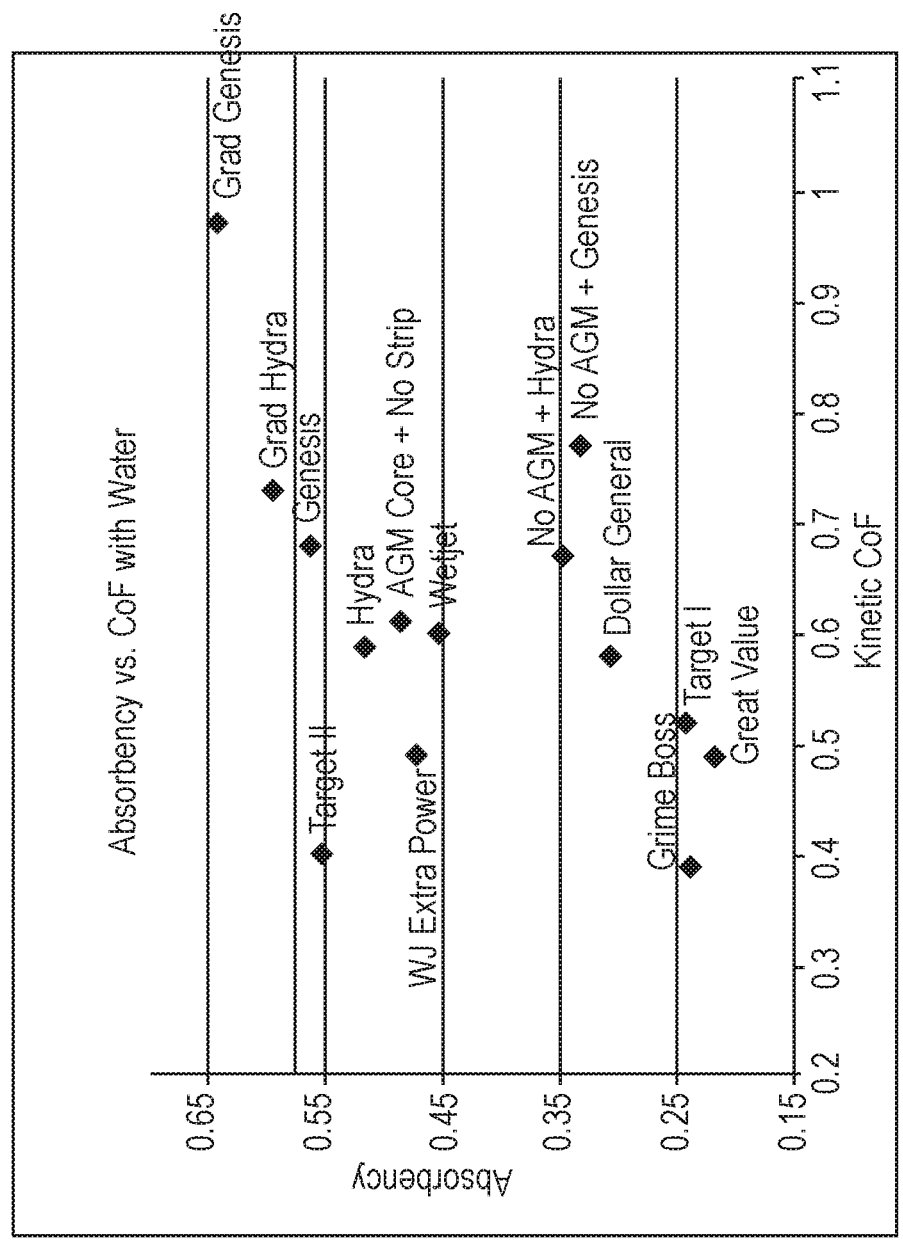

Referring to FIG. 3C, it can be seen that under testing with deionized water, cleaning pads (10) according to the present invention may have coefficient of friction of at least 0.6 [current WetJet having a coefficient of friction of 0.6 with water], preferably at least 0.65, more preferably at least 0.7, but less than 0.9, and preferably less than 0.8. A coefficient of friction with water in this range is judged advantageous for cleaning purposes, without requiring undue cleaning effort at greater friction levels or without skipping over dirt and not adequately cleaning the floor at lower friction levels.

Figure 3D:
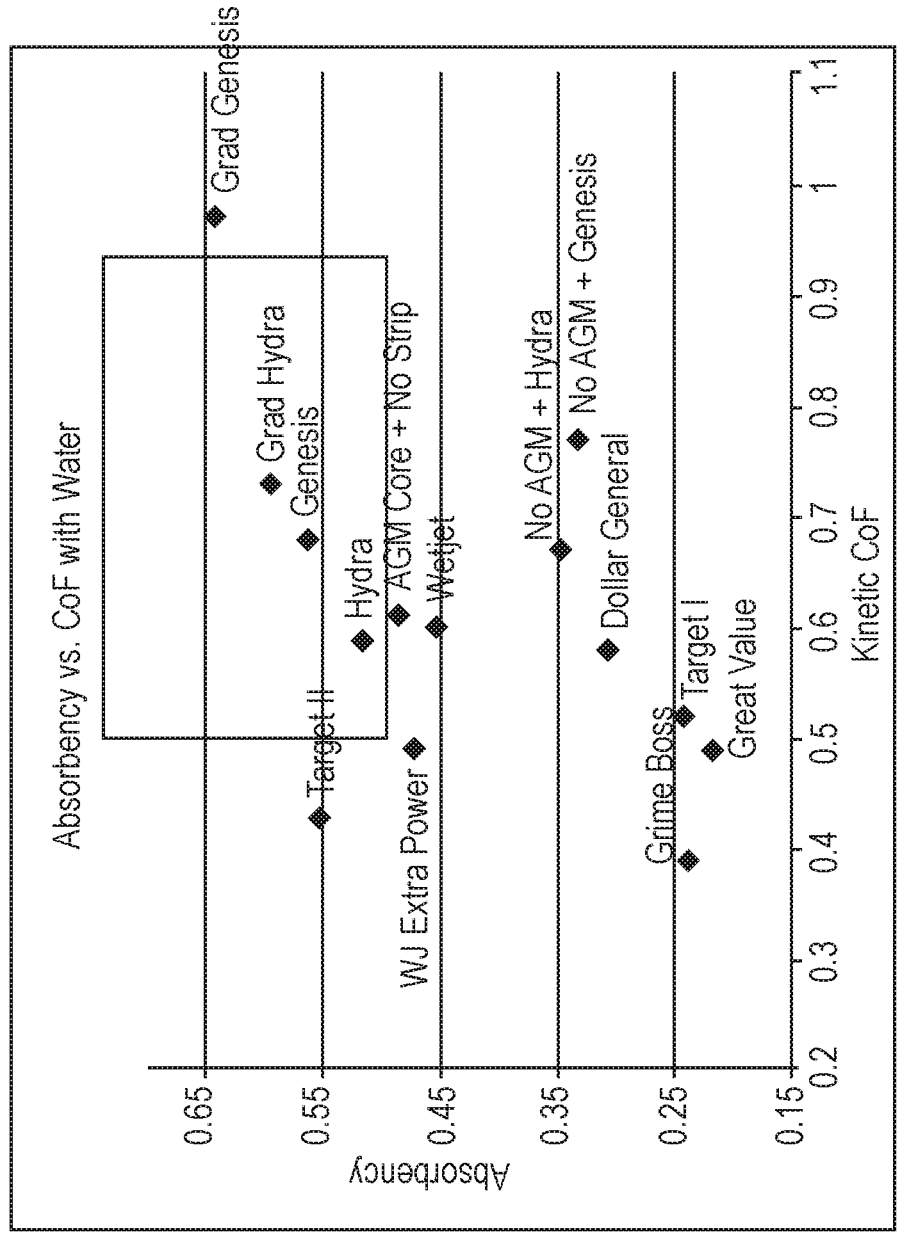

Referring to FIG. 3D, it can be seen that under testing with deionized water, particularly desirable cleaning pads (10) according to the present invention may have a coefficient of friction of at least 0.4, more preferably at least 0.5, more preferably at least 0.6, more preferably at least 0.65, more preferably at least 0.7, but less than 0.9 or less than 0.8 and may further have an absorbency of at least 0.45, preferably at least 0.48, more preferably at least 0.5, more preferably at least 0.55, more preferably at least 0.6, more preferably at least 0.65, but less than 1.0, 0.9 or 0.8. The performance of such a cleaning pad (10) is represented by the shaded box of FIG. 3D.

To further investigate the performance of a cleaning pad (10) according to the present invention, the cleaning pads (10) were tested with an amine oxide cleaning solution, as described herein. It is believed that testing with this amine oxide cleaning solution more accurately represents the cleaning performance of a cleaning pad (10) in use.

Figure 4A:
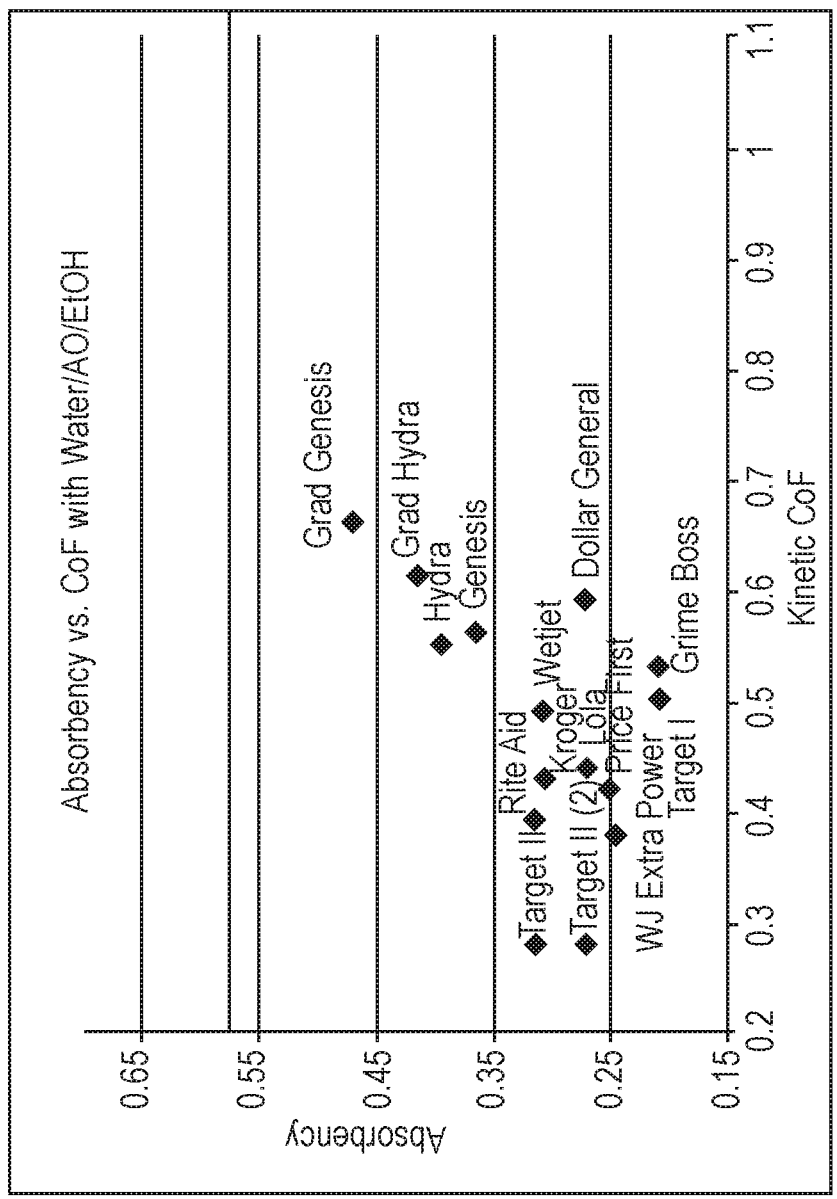
FIGS. 4A-4F are graphical representations of the generally proportionate relationship between coefficient of friction with a representative amine oxide cleaning solution and absorbency of the amine oxide cleaning solution.

Referring to FIG. 4A, the inventors have recognized that, under testing with amine oxide cleaning solution, cleaning pads (10) exhibit a generally positive correlation between coefficient of friction and absorbency. Conceptually three relatively straight lines may be drawn, one from WetJet Extra Power to Grad Genesis, one from Target II (2) to Rite Aid, and one from Target I to Dollar General. All three lines have a generally similar slope and linear correlation. Such correlation is unexpected in view of the prior art.

Figure 4B:
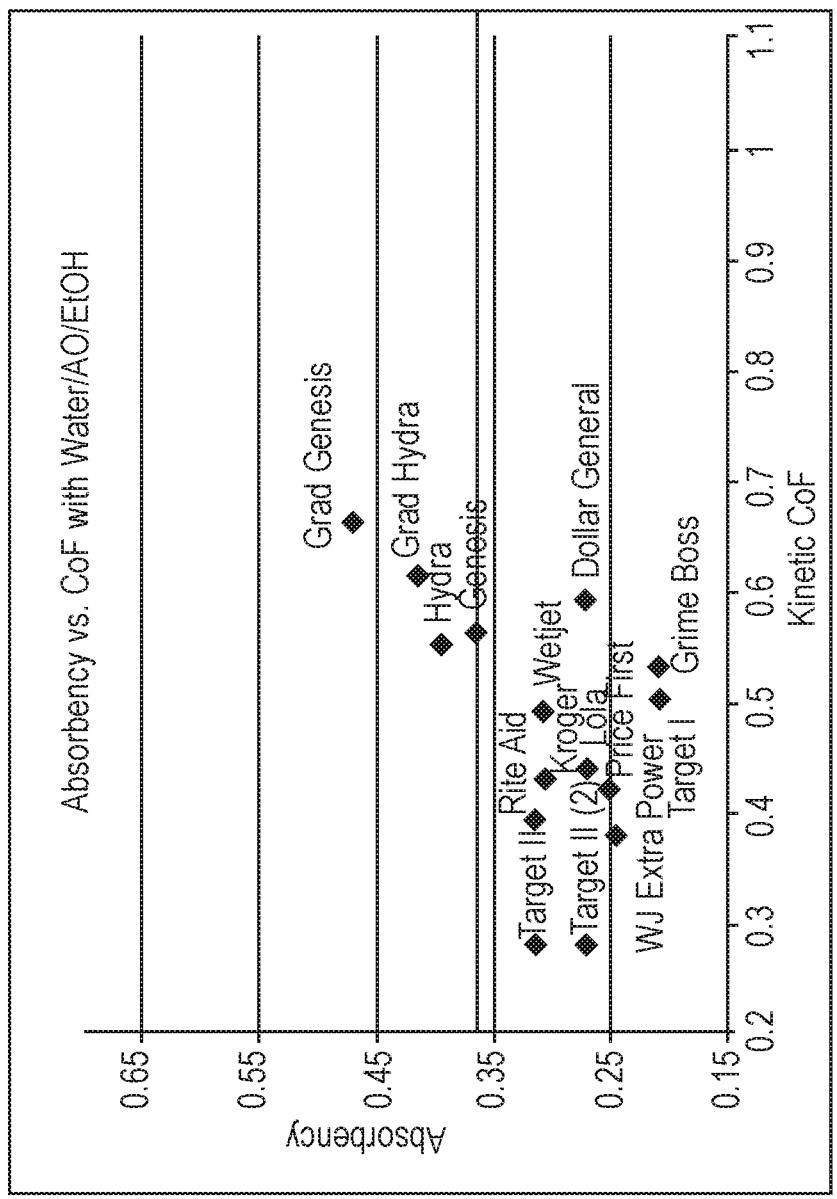

Referring to FIG. 4B, it can be seen that under testing with amine oxide cleaning solution, cleaning pads (10) according to the present invention may have an absorbency with amine oxide cleaning solution of at least 0.35, preferably at least 0.4, more preferably at least 0.45, more preferably at least 0.5, more preferably at least 0.55, but less than 0.9, 0.85 or 0.8. An absorbency with amine oxide cleaning solution in this range is judged advantageous for cleaning purposes, without requiring undue AGM (16A) levels and the associated costs and material handling challenges.

Figure 4C:
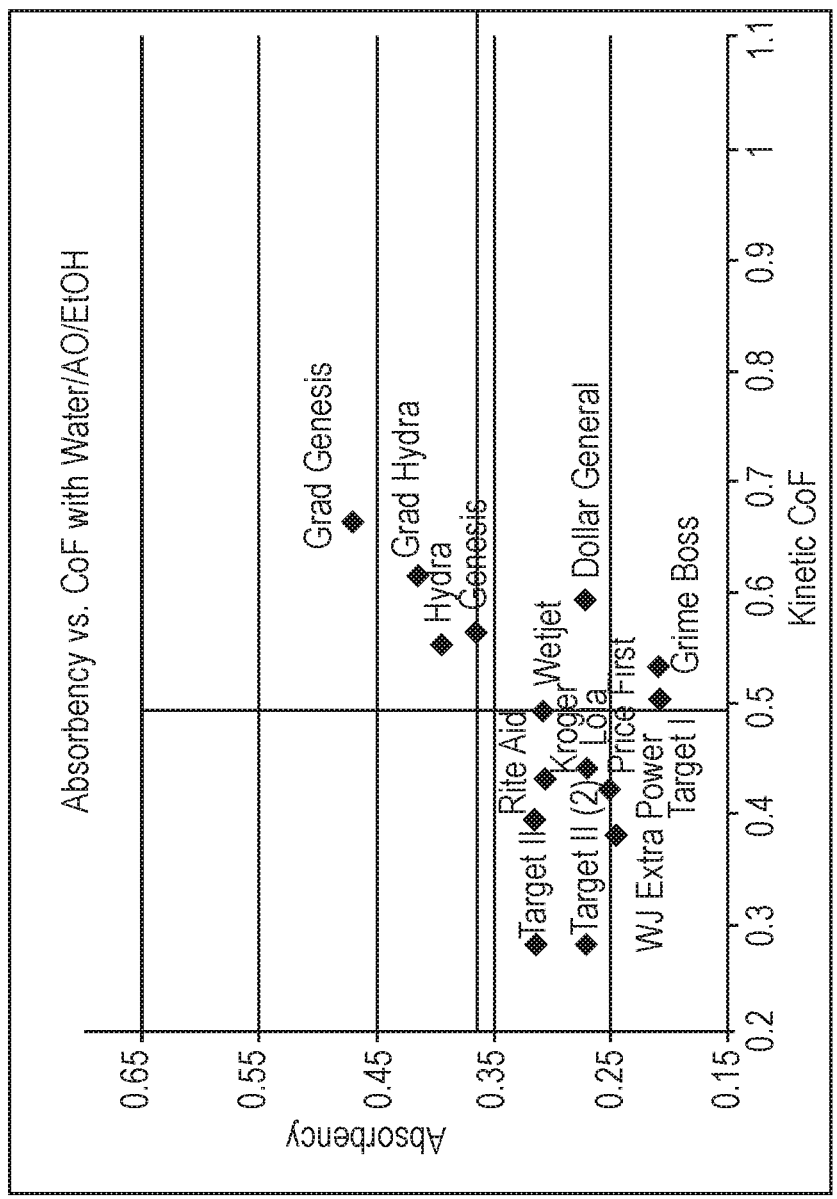

Referring to FIG. 4C, it can be seen that under testing with amine oxide cleaning solution, cleaning pads (10) according to the present invention may have a coefficient of friction of at least 0.5, preferably at least 0.55, more preferably at least 0.6, more preferably at least 0.65, but less than 0.9, and more preferably less than 0.8 and more preferably less than 0.75. A coefficient of friction with amine oxide cleaning solution in this range is judged advantageous for cleaning purposes, without requiring undue cleaning effort at greater friction levels or without skipping over dirt and not adequately cleaning the floor at lower friction levels.

Figure 4D:
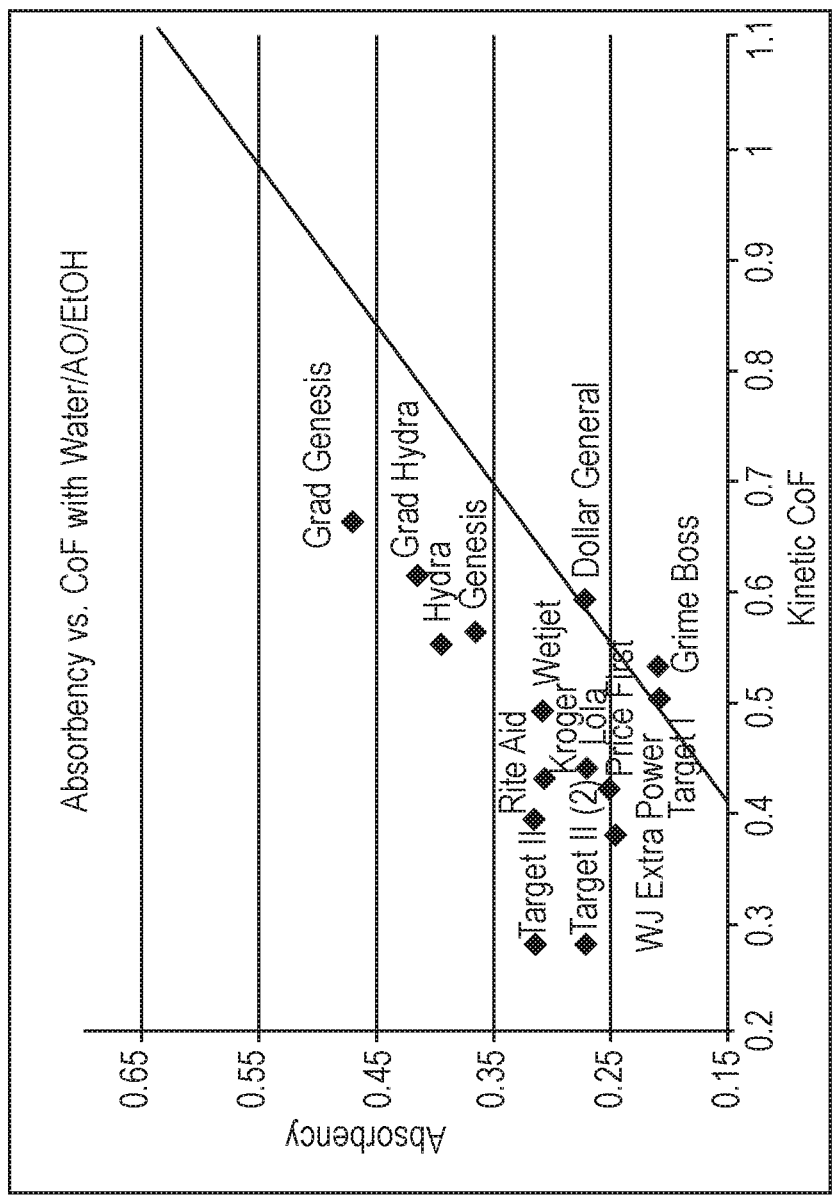

Referring to FIG. 4D, it can be seen that under testing with amine oxide cleaning solution, cleaning pads (10) according to the present invention may have an absorbency conforming to the inequality:

$$\text{Absorbency} > 0.7 * \text{cof} - 0.14,$$

wherein $0.5 < \text{cof} < 0.85$ and
absorbency$<1$,
and cof is the coefficient of friction.

Optionally $0.55 < \text{cof} < 0.8$, or $0.6 < \text{cof} < 0.75$.

absorbency$<0.9$ or $<0.8$ and the 0.7 multiplier of the coefficient of friction may be 0.75-0.8. Such inequality is unexpected in view of the prior art.

A cleaning pad (10) that conforms to this inequality is judged advantageous for cleaning purposes, without requiring undue AGM (16A) levels and the associated costs and material handling challenges and judged advantageous without requiring undue cleaning effort at greater friction levels or without skipping over dirt and not adequately cleaning the floor at lower friction levels, wherein: $0.5 < \text{cof} < 0.9$, and/or $0.35 < \text{absorbency} < 0.60$.

An absorbency with amine oxide cleaning solution in this range is judged advantageous for cleaning purposes, without requiring undue AGM (16A) levels and the associated costs and material handling challenges.

Figure 4E:
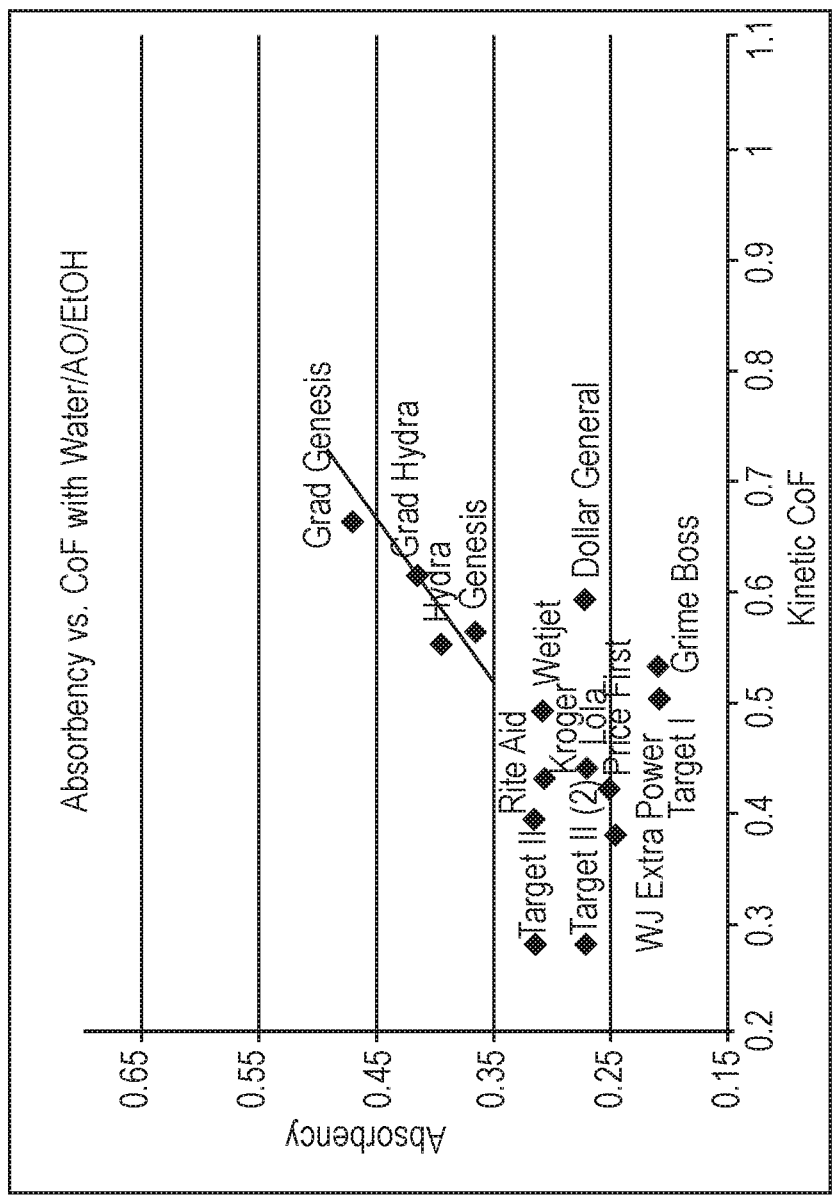

Referring to FIG. 4E, the unpredicted linear relationship of four cleaning pad (10)s according to the present invention is illustrated. But utilizing this previously unknown relationship it is believed an improved cleaning pad (10) is provided.

Figure 4F:
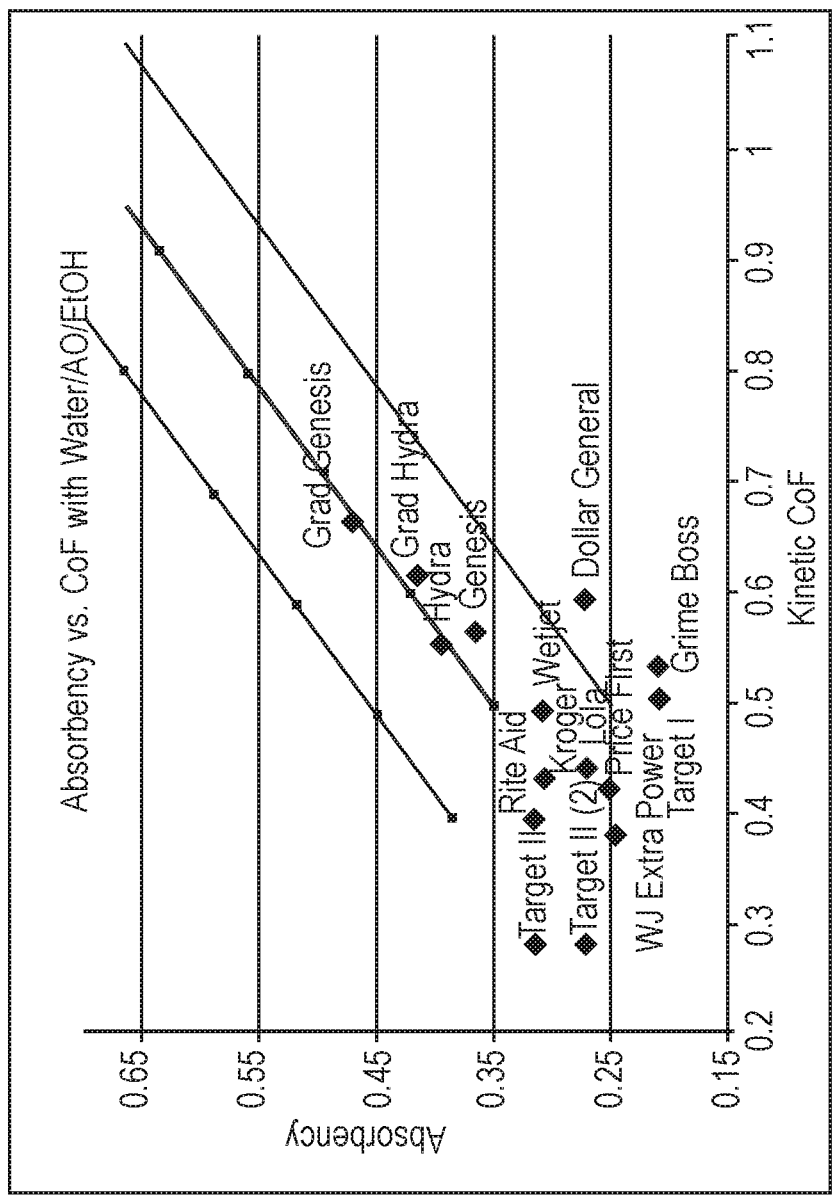

Referring to FIG. 4F, a cleaning pad (10) according to the present invention may conform to the region of the graph illustrated between the upper and lower lines. Such a cleaning pad (10) may conform to the equation Absorbency=$0.7*\text{cof}+/-0.1$.

wherein $0.5 < \text{cof} < 0.9$ and
absorbency$<1$,
and cof is the coefficient of friction.

Optionally $0.55 < \text{cof} < 0.75$, absorbency$<0.9$ or $<0.8$ and the band about the line can be $+/-0.05$. Such equation is unexpected in view of the prior art.

Test Methods

Prior to any testing, each cleaning pad (10) is conditioned for at least 24 hours in a controlled room at 20-25 degrees C. and 40-50% relative humidity.

Surface Texture

The texture outwardly facing surface of the smoothing strip (12) is measured while the smoothing strip (12) is still attached to the balance of the cleaning pad (10). The cleaning pad (10) is cut, parallel to the width dimension of the cleaning pad (10) using a sharp knife in a manner that is not injurious to the texture of the floor sheet (14) or smoothing strip (12). The sample is viewed from the edge, so that a cross sectional view of the cut plane can be measured.

The surface texture topography of the smoothing strip (12) is determined to the nearest 0.01 mm, by measuring a linear distance along an axis perpendicular to the floor-facing planar surface of the smoothing strip (12). The distance to be measured is the vertical span, perpendicular to the plane of the smoothing strip (12), between the bottom of a valley and the top of an adjacent peak, wherein both endpoints are located on the floor-facing surface of the smoothing strip (12). Distances are measured using the Point to Point measurement function or equivalent.

This procedure is repeated for a total of n=1 measurements on each of five different cleaning pads (10). The five results are averaged to determine the surface texture for the smoothing strip (12).

A suitable digital microscope for making the measurements is a Nikon SMZ1500 with the Nikon TV Lens C–0.6x, having an Infinity 2 Camera from Lumenera Corporation of Ottawa, Canada. Suitable measurement software includes INFINITY ANALYZE, Release 5.0.3 from Lumenera Corporation.

AGM Gradient

Prophetically Micro X-ray Computed Tomography [CT] may be used to determine if the core (16), or a layer thereof, has a gradient AGM (16A) distribution. CT imaging reports the X-ray absorption of a sample in three-dimensions. MicroCT scanner instruments use a cone beam X-ray source to irradiate the sample. The radiation is attenuated by the sample and a scintillator converts the transmitted X-ray radiation to light and passes it into an array of detectors. X-ray attenuation is largely a function of the material density of the sample, so denser materials require a higher energy to penetrate and appear brighter (higher attenuation), while void areas appear darker (lower attenuation). Intensity differences in grey levels are used to distinguish between different structures in the sample, such as synthetic/cellulose fibers, AGM (16A) particles, voids, and non-void areas. Two-dimensional (2D) projected images can be acquired from different angles as the sample is rotated, enabling the creation of a digital three-dimensional (3D) reconstruction image of the sample using 3D imaging software. Resolution is a function of the instrument characteristics, diameter of the field of view and the number of projections used. The dataset obtained of the sample is visualized and analyzed via image processing software program(s) in order to measure 3D structures and intensities.

Absorbency

Absorbency is measured using the following equipment.

A floor mop having a weight of 2.2+/−0.2 kg without the cleaning pad (10) and having a handle (34) and head (32). The head (32) is connected to the proximal end of the handle (34) by a ball and socket joint or universal joint.

Figure 6:
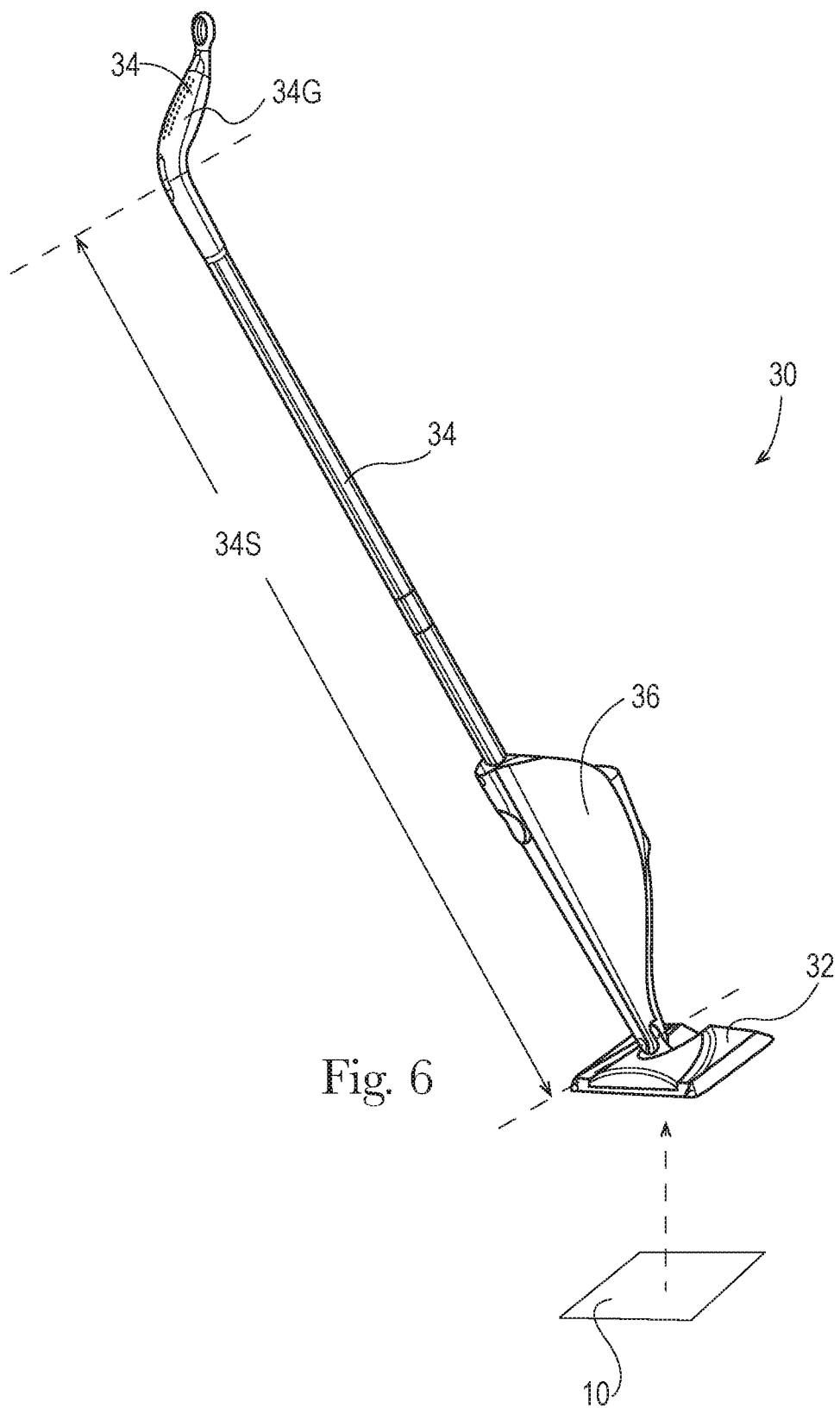
FIG. 6 is a perspective view of a cleaning implement usable with the cleaning pad of the present invention and showing the cleaning pad in position to be removably attached to the cleaning implement.
Figure 1A:
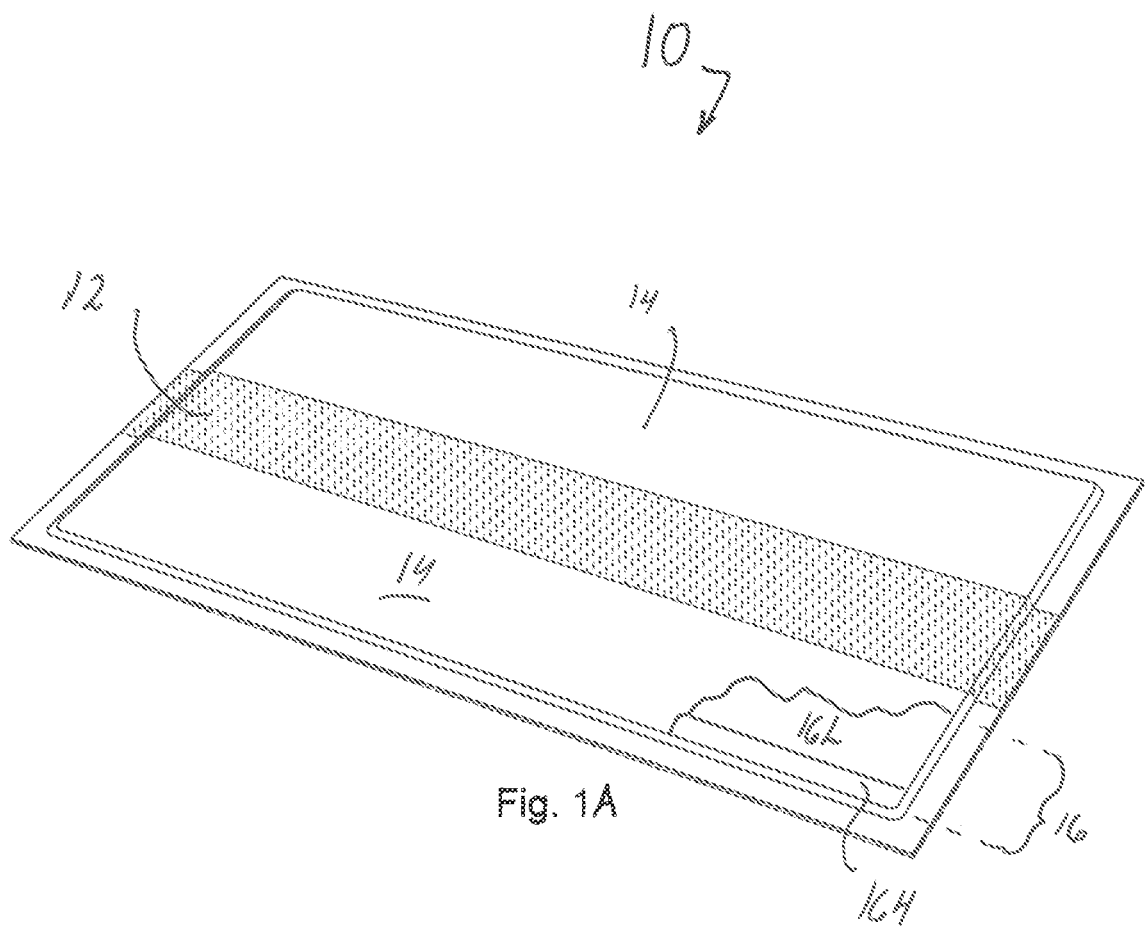

Referring to FIG. 6, the head (32) is rectangular with dimensions of 11.4 cm×27.3 cm, a 2 mm crown extending in the 27.3 cm direction and is covered with a compliant surface, such as EVA on the floor side. The handle (34) has a straight section (34S) with a length of 108+/−2.5 cm from the center of the ball and socket or universal joint. The straight section (34S) of the handle (34) has a grip (34G) at the distal end thereof, the grip (34G) being oriented at 45+/−5 degrees to the straight section (34S). The center of the grip (34G), as grasped by a typical user, is 5+/−2 cm from the transition between the straight section (34S) and grip (34G). A Swiffer WetJet (30) mop currently sold by the instant assignee, is suitable.

A metronome set at 70 beats per minute.

An mahogany plank engineered hardwood floor having dimensions of 122 cm×91 cm with an aluminum oxide polyurethane coating and contact angle of 100+/−15 degrees with deionized water. Each plank is 12.1 cm wide with a 1 mm gap between adjacent planks. The floor has a 60 degree gloss reading of 85+/−5 Gloss Units. The boards are aligned parallel to the short direction, so that each board is at least 91 cm long extending that length without a seam. A Home Legend Santos Mahogany Engineered Hardwood floor, UPC 664646301473, has been found suitable.

A tared bottle of the liquid to be tested.

A hand-held trigger sprayer which sprays approximately 1.24 grams per stroke.

A scale accurate to 0.01 grams, as available from Mettler Toledo.

1300 grams of dionized water.

1300 grams of solution comprising 0.04% amine oxide active (C10-16 Alkyldimethyl) CAS no. 70592-80-2, 0.5% EtOH ethyl alcohol and balance deionized water. This solution is herein throughout referred to as an amine oxide cleaning solution, and is representative of common, commercially available cleaning solutions.

80/20 dionized water/isopropyl alcohol solution.

The floor is cleaned before each trial with the 80/20 water/IPA solution and dried with paper towels. A sample cleaning pad (10) is weighed to determine the initial weight using the scale.

Figure 5:
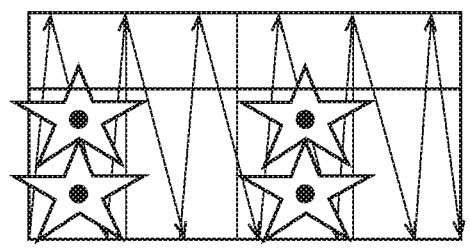
FIG. 5 is a schematic representation of the floor and stroke pattern used for the absorbency test.

Referring to FIG. 5, the floor may be conceptually divided into a 4×3 grid of 12 squares, with each square being 30.5 cm×30.5 cm. Deionized water is sprayed onto the test surface in the respective centers of the four squares spaced as shown with the stars, so that an uneven distribution of the water occurs. Approximately 2.75 to 3 grams of water is sprayed onto each square indicated in FIG. 5 for a total of 11 to 12 grams of water on the test surface. The spray bottle is reweighed to determine the amount of liquid sprayed onto the floor.

The cleaning pad (10) is attached to the mop. If the cleaning pad (10) is larger than the head (32), the cleaning pad (10) is centered and trimmed to fit, so that an edge of the cleaning pad (10) does not fold or improperly drag during testing. If a smaller cleaning pad (10) is used, the cleaning pad (10) is centered on the head (32).

The metronome is actuated. The mop is stroked forward and backwards six strokes in each direction for a total of 12 strokes to cover the entire floor from left to right as shown in FIG. 5. The test is conducted using ordinary mopping force as applied through the mop handle (34) for the prescribed mopping rate, with no intentional compressive force added or subtracted by the user, so that the total weight on the floor remains 2.2+/−0.5 kg. The 12 strokes are repeated in reverse from right to left, to return to the starting point to complete one trial. The test user does not step on the test surface during any portion of the 12 strokes, but moves left to right as occurs under ordinary mopping conditions.

Mopping occurs at the rate of 70 strokes per minute, using the metronome. Each beat of the metronome matches a stroke from forward to backwards or vice versa, for 24 total beats during the strokes used to complete a single test. The cleaning pad (10) is reweighed to determine the amount of liquid absorbed during mopping. The percentage of the water absorbed by the cleaning pad (10) is determined by dividing the amount of water absorbed by the amount of water dosed onto the test floor and converted to a decimal value.

This procedure is repeated for a total of n=13 trials for each cleaning pad (10) and the results averaged, with the floor being cleaned before each new trial using the aforementioned 80/20 solution. A total of n=3 cleaning pads (10) are tested. The results of the three cleaning pads (10) are averaged to obtain the absorbency of that pad for deionized water. The absorbency is reported as a decimal, representing a fraction between and including 0 and 1.

This procedure, including the floor preparation, is repeated for the aforementioned amine oxide/ethyl alcohol solution. This solution, referred to herein as an amine oxide cleaning solution represents a common type of commercially available cleaning solution for the test purposes described and claimed herein.

Coefficient of Friction

The coefficient of friction of a material is the resistive force of friction divided by the normal or perpendicular force pushing the material against a surface. The coefficient of friction test method uses a Friction/Peel Tensile Tester, Model Insight 10 from MTS System Corporation of Eden Prairie, Minn. to measure the kinetic coefficient of friction.

A 203 g sled, with dimensions of 6.5 cm×11.0 cm×1.5 cm and having hook fasteners on the bottom surface is provided. A first sample of the cleaning pad (10) is attached to the sled using the hooks. If the cleaning is larger than the sled, the cleaning pad (10) is centered and trimmed to fit, so that an edge of the cleaning pad (10) does not fold during testing. If a smaller cleaning pad (10) is used, the cleaning pad (10) is centered on the sled. The pressure of the sled is about 2.84 g/cm$^2$. This pressure simulates the typical pressure applied to a cleaning pad (10) by a lightweight mop while a user is cleaning a floor.

The test surface is a glass plate 15 cm wide×28 cm long×5 mm thick, available from MTS System Corporation as part of Friction Test apparatus, part no. 100087526. The sled and test surface are cleaned using the aforementioned 80/20 IPA/water solution. The instrument is set up as follows:
1. Set the "Sled Weight" to 203 g.
2. Set the "Data Acq. Rate" to 20 Hz.
3. Set the "Begin Point" to 10 mm
4. Set the "End Point" to 130 mm
5. Set the "Extension Limit High" to 135 mm
6. Set the "Crosshead" speed to 1000 mm/min
7. "Return" the load cell to the starting point for test.
8. Place the first sample and sled on top of the glass plate at about 5 mm from back edge of the glass test surface such that the sled is lined up at the center of the path where the hook on the sled lines up with the eyelet of the load cell.
9. Attach the sled to the load cell by passing a string through the pulley and up to the clamp on the test apparatus. Close the clamp on the string to secure it.
10. Add 0.5 ml of test solution to the glass plate using a volumetric pipette 1 cm in front of the sample. The test solution should be applied to an area of about 50 mm in width (the width being defined as the dimension perpendicular to the direction of the sled) by 20 mm in length (the length being defined as the dimension parallel to the direction of the sled in motion) The same test solution is used for both the absorbency test and the coefficient of friction test. That absorbency and coefficient of friction are either both tested with water or both tested with the amine oxide cleaning solution described herein.
11. Initiate test by pressing the "play" icon. The load cell starts moving from the back to the front dragging the sled and the test sample.
12. When the test is complete, the load cell stops and the program will display the measure of the Static Coefficient of Friction (ST) as well as the Kinetic Coefficient of Friction (KI). Record the Kinetic Coefficient of Friction measurement. Activate the "Return" button so that the sled with the sample returns to the starting position. Position the sled in the starting position. Then press the play icon in order to repeat the test.
13. Again when the test is completed, the load cell stops and the program will display the Kinetic Coefficient of friction. Record this measurement.
14. Again activate the Return button to send the sled back to the start position.
15. Repeat test by positioning the sled with test sample at back edge as previously discussed.
16. Each sample is tested three times. The test surface is not re-wetted for the second and third trials.
17. Calculate the average of these 3 measurements
18. Repeat this procedure for n=3 samples and average the results.

Static Contact Angle

The cleaning pad (10) is tested with the floor sheet (14) facing upwardly, so that the floor sheet (14) and smoothing strip (12), are exposed. The back sheet (18) is placed on a flat, horizontal surface. The area of test sample (i.e., floor sheet (14) or smoothing strip (12)) is sufficient to prevent spreading of the test drop to the edge of the sample being tested or drops from contacting each other. The sample test surface is not directly touched during preparation or testing, to avoid finger contamination.

A contact angle goniometer is used to measure the static contact angle of the floor sheet and/or smoothing strip. The method described hereinbelow is derived from ASTM D5946-09.

The apparatus for measuring contact angle has: (1) a liquid dispenser capable of suspending a sessile drop, as specified, from the tip of the dispenser, (2) a sample holder that allows a sample to lay flat without unintended wrinkles or distortions, and hold the sample so that the surface being measured is horizontal, (3) provision for bringing the sample and suspended droplet towards each other in a controlled manner to accomplish droplet transfer onto the test surface, and (4) means for capturing a profile image of the drop with minimal distortion. A 5 degree lookdown angle is used, so that the line of sight is raised 5 degrees from the horizontal and the baseline of the drop is clearly visible when in contact with the sample. The apparatus has means for direct angle measurements, such as image analysis of the drop dimensions and position on the sample. A FTÅ200 dynamic contact angle video system analyzer manufactured by First Ten Angstroms, Portsmouth, Va. has been found suitable. FTÅ software supplied by First Ten Angstroms (Build 362, Version 2.1) has been found suitable. Lighting is adjusted so a clear image is resolvable by the software, to extract the baseline and droplet contour without user input.

A test sample is placed onto the specimen holder of the instrument ensuring that the sample is lying flat without unintended wrinkles or distortions. A single droplet of 6.5+/−1.5 µL of deionized water is transferred by contact from a 22 gauge syringe needle dispenser onto the surface of the sample, i.e. the floor sheet (14) or smoothing strip (12), as the case may be. Images of the profile of the drop are collected by the software at a rate of at least 20 images/s. The contact angle between the droplet and the test surface is measured, in degrees, when the sessile volume has decreased by 2% of the initial volume. If a 2% decrease in sessile volume does not occur, as for example may happen if the test sample is not absorbent, the contact angle is measured at equilibrium, as determined by lack of additional wetting and lack of movement of the droplet.

The test sample is moved, in order to place the next droplet onto a clean, undisturbed area of the sample, preferably at least 25 mm away from any previous measurements. The test is repeated for a total of n=5 samples. The measurements are checked to see if the measurements vary by more than 5 degrees from the minimum reading to the maximum reading. If the results of n=5 tests do not vary by more than 5 degrees, and the n=5 results are averaged to yield the static contact angle.

If the readings vary by more than 5 degrees, then a total of n=20 readings are taken and the results averaged. The n=20 average is then used.

Implement (30)

The cleaning pad (10) according to the present invention may be used by hand or with a cleaning implement (30). Referring to FIG. 6, the cleaning implement (30) may comprise a plastic head (32) for holding the cleaning pad (10) and an elongate handle (34) articulably connected thereto. The handle (34) may comprise a metal or plastic tube or solid rod.

The head (32) may have a downwardly facing surface, to which the cleaning pad (10) may be attached. The downwardly facing surface may be generally flat, or slightly convex. The head (32) may further have an upwardly facing surface. The upwardly facing surface may have a universal joint to facilitate connection of the elongate handle (34) to the head (32).

A hook and loop system may be used to attach the cleaning pad (10) directly to the bottom of the head. Alternatively, the upwardly facing surface may further comprise a mechanism, such as resilient grippers, for removably attaching the cleaning pad (10) to the implement (30). If grippers are used with the cleaning implement (30), the grippers may be made according to commonly assigned U.S. Pat. Nos. 6,305,046; 6,484,346; 6,651,290 and/or D487,173.

The cleaning implement (30) may further comprise a reservoir for storage of cleaning solution. The reservoir may be replaced when the cleaning solution is depleted and/or refilled as desired. The reservoir may be disposed on the head (32) or the handle (34) of the cleaning implement (30). The neck of the reservoir may be offset per commonly assigned U.S. Pat. No. 6,390,335. The cleaning solution contained therein may be made according to the teachings of commonly assigned U.S. Pat. No. 6,814,088.

The cleaning implement (30) may further comprise a pump for dispensing cleaning solution from the reservoir onto the target surface, such as a floor. The pump may be battery powered or operated by line voltage. Alternatively, the cleaning solution may be dispensed by gravity flow. The cleaning solution may be sprayed through one or more nozzles to provide for distribution of the cleaning solution onto the target surface in an efficacious pattern.

If a replaceable reservoir is utilized, the replaceable reservoir may be inverted to provide for gravity flow of the cleaning solution. Or the cleaning solution may be pumped to the dispensing nozzles. The reservoir may be a bottle, and may be made of plastic, such as a polyolefin. The cleaning implement (30) may have a sleeve (36), which removably receives the bottle, or other reservoir. The cleaning implement (30) may have a needle, optionally disposed in the sleeve (36) to receive the cleaning solution from the bottle. The bottle may have a needle piercable membrane, complementary to the needle, and which is resealed to prevent undesired dripping of the cleaning solution during insertion and removal of the replaceable reservoir. Alternatively or additionally, If desired, the implement (30) may also provide for steam to be delivered to the cleaning pad (10) and/or to the floor or other target surface.

A suitable reservoir of cleaning solution and fitment therefor may be made according to the teachings of commonly assigned U.S. Pat. Nos. 6,386,392, 7,172,099; D388,705; D484,804; D485,178. A suitable cleaning implement (30) may be made according to the teachings of commonly assigned U.S. Pat. Nos. 5,888,006; 5,960,508; 5,988,920; 6,045,622; 6,101,661; 6,142,750; 6,579,023; 6,601,261; 6,722,806; 6,766,552; D477,701 and/or D487,174. A steam implement (30) may be made according to the teachings of jointly assigned 2013/0319463.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" whether or not the term 'about' is expressly recited. Every range disclosed herein includes all endpoints of that range whether disclosed within that range or as part of a related range. Thus two endpoints of the same range may be disclosed as endpoints of broader or narrower ranges. The common mathematical symbols > and < mean greater than or equal to and less than or equal to, respectively, and include the endpoints set forth in the equations and inequalities below.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning pad comprising:
 a liquid pervious floor sheet, and
 an absorbent core juxtaposed with said floor sheet and comprising absorbent gelling material therein, said absorbent gelling material being distributed in a gradient with a decreasing AGM percentage as said floor sheet is approached,
 said cleaning pad satisfying the inequality:
  absorbency with amine oxide cleaning solution=0.75*cof+/−0.1, wherein 0.55<cof <0.75,
absorbency is between 0.50 and 0.6, and
cof is the coefficient of friction with amine oxide cleaning solution,
wherein said core comprises a single layer, wherein said gradient comprises stepwise increments.

\* \* \* \* \*